United States Patent
Gell

(12) 
(10) Patent No.: US 6,577,858 B1
(45) Date of Patent: Jun. 10, 2003

(54) ACCOUNTING SYSTEM IN A COMMUNICATION NETWORK

(75) Inventor: Michael Anthony Gell, Ipswich (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 08/849,409
(22) PCT Filed: Dec. 4, 1995
(86) PCT No.: PCT/GB95/02826
  § 371 (c)(1),
  (2), (4) Date: Jun. 27, 1997
(87) PCT Pub. No.: WO96/17466
  PCT Pub. Date: Jun. 6, 1996

(30) Foreign Application Priority Data

Dec. 2, 1994 (EP) .............................. 94308990

(51) Int. Cl.[7] ...................... H04M 15/00; H04M 11/00; H04M 3/00
(52) U.S. Cl. ................... 455/407; 455/418; 379/112.01
(58) Field of Search ................... 455/406, 407, 455/514, 557, 558, 418; 379/91.01, 93.22, 100.04, 114, 123, 112.01

(56) References Cited

U.S. PATENT DOCUMENTS

| | | | |
|---|---|---|---|
| 4,359,631 A | | 11/1982 | Lockwood et al. |
| 4,640,986 A | * | 2/1987 | Yotsutani et al. |
| 4,776,000 A | * | 10/1988 | Parienti |
| 4,776,003 A | * | 10/1988 | Harris .................. 455/407 |
| 4,777,646 A | * | 10/1988 | Harris .................. 455/407 |
| 4,933,966 A | | 6/1990 | Hird et al. |
| 4,965,821 A | * | 10/1990 | Bishop et al. |
| 4,979,207 A | * | 12/1990 | Baum et al. |
| 5,046,085 A | * | 9/1991 | Godsey et al. .............. 379/112 |

(List continued on next page.)

FOREIGN PATENT DOCUMENTS

| | | |
|---|---|---|
| EP | A0185365 | 6/1986 |
| EP | A0325564 | 7/1989 |
| EP | A0341219 | 11/1989 |
| EP | A0402302 | 12/1990 |
| EP | A9474555 | 3/1992 |

OTHER PUBLICATIONS

Patent Abstracts of Japan, vol. 13, No. 243 (E–768), Jun. 7, 1989 & JP,A,01 044157 (Hitachi Ltd) Feb. 16, 1989.

Electronics and Communications in Japan, vol. 73, No. 1, Jan. 1990, New York, US, pp. 36–54, XP000138107 "IC Card–Based Advanced Man–Machine Interface for Public Swtiched Telephone Network Service".

Philips Telecommunication Review, vol. 52, No. 1, Mar. 1994, Hilversum NL, pp. 15–19, XP002005598, J. Hanckmann: Telescript: The Emerging Standard for Intelligent Messaging:, p. 18, paragraph "Intelligent messaging".

*Primary Examiner*—William Cumming
(74) *Attorney, Agent, or Firm*—Nixon & Vanderhye P.C.

(57) ABSTRACT

A communication system includes a communication utilizing apparatus connectable to a communications network and service provision apparatus for making services available to the communications utilizing apparatus. An accounting device is associated with the communications utilizing apparatus and includes a digital data storage device arranged to store details of the receipt of services by the communications utilizing apparatus a signalling circuit arranged to receive, via the communications network, signals indicating a payment due in respect of services provided by the service provision apparatus, and a comparison device arranged to compare the received indications with data derived from the stored details.

29 Claims, 15 Drawing Sheets

U.S. PATENT DOCUMENTS

| | | | |
|---|---|---|---|
| 5,109,401 A | * | 4/1992 | Hattori et al. |
| 5,134,651 A | * | 7/1992 | Ortiz et al. |
| 5,142,566 A | * | 8/1992 | Meschi ......................... 379/98 |
| 5,220,593 A | * | 6/1993 | Zicker et al. ............... 379/144 |
| 5,272,747 A | * | 12/1993 | Meads ........................ 379/144 |
| 5,276,679 A | | 1/1994 | McKay et al. |
| 5,359,182 A | * | 10/1994 | Schilling .................... 379/357 |
| 5,361,297 A | * | 11/1994 | Ortiz et al. |
| 5,577,101 A | * | 11/1996 | Bohm ........................ 379/119 |
| 5,631,947 A | * | 5/1997 | Wittstein et al. |
| 5,751,798 A | * | 5/1998 | Mumick et al. ............. 379/112 |
| 5,774,533 A | * | 6/1998 | Patel .......................... 379/127 |
| 6,098,878 A | * | 8/2000 | Dent et al. .................. 235/380 |
| 6,101,379 A | * | 8/2000 | Rahman et al. ............. 455/406 |
| 6,108,531 A | * | 8/2000 | Berg et al. .................. 455/408 |
| 6,115,601 A | * | 9/2000 | Ferreira ..................... 455/406 |
| 6,243,574 B1 | * | 6/2002 | McGreggor et al. ........ 455/418 |

\* cited by examiner

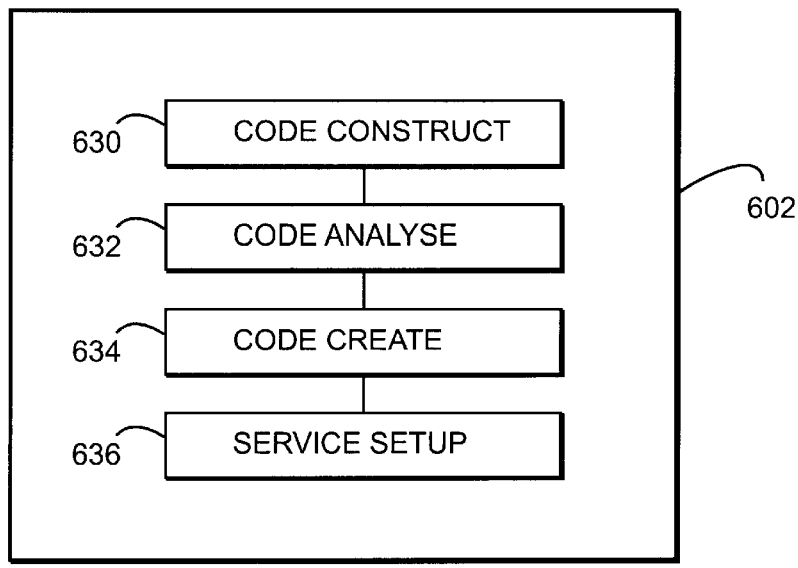
Fig.13
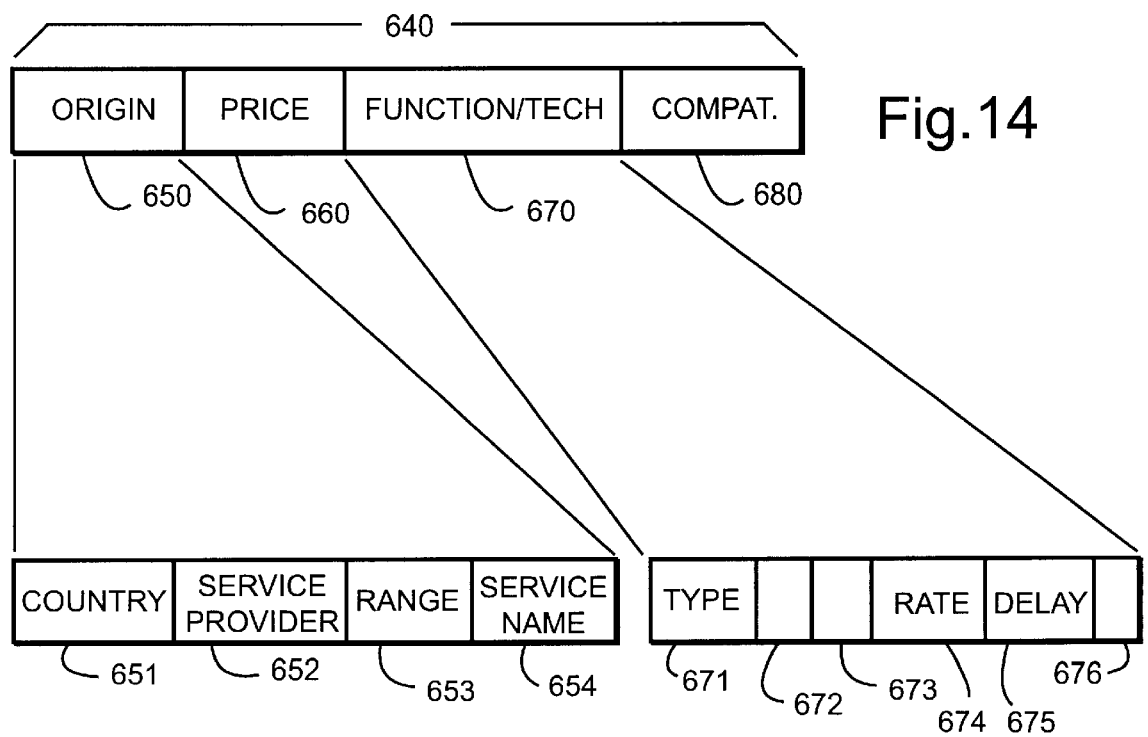
Fig.14
Fig.15a  Fig.15b

ACCOUNTING SYSTEM IN A COMMUNICATION NETWORK

BACKGROUND OF THE INVENTION

1. Field of the Invention

This invention relates to communication apparatus, and more particularly to communications apparatus for supplying and acquiring products and services from one or more suppliers of communications services or services offered over communications channels.

The invention is chiefly, but not exclusively, concerned with the supply of telecommunication services to a customer from one or more telecommunications suppliers.

2. Related Art

More particularly, the present invention is primarily concerned with the communication or billing or charging information. At present, different suppliers of telecommunications services charge on different bases. Suppliers of data network services (e.g. local area networks) often charge on a fixed rate basis, without taking any account of the amount of usage at the network. This makes accounting extremely simple. On the other hand, telecommunication companies have historically charged for network usage, and have evolved fairly complicated charging strategies which differentiate between local and national calls, calls at different times of day, and so on.

In many existing networks, communications bandwidth is a scarce resource, and hence such pricing strategies tend to reflect this by pricing at a higher rate services for which there is greater demand, so as to attempt to optimise the usage of the network. It is to be expected that there will continue to be a desire to make more efficient use of communications bandwidth in future. Our earlier international application number PCT/GB94/01128 (A24601), filed on May 24, 1994, published as WO94/28683, describes a telecommunications system in which customer terminal apparatus is arranged to negotiate "on the spot" prices with different telecommunications suppliers. In the system described in that application (which is hereby incorporated by reference in its entirety) there may be no "standard" tariffs; instead, each call (or other network service) may be priced individually.

Our earlier filed British patent application No. 94303092.4, filed on Apr. 28, 1994 (Agents reference A24847), and published as WO95/30317, discloses negotiation in an integrated telecommunications network, and is incorporated herein in its entirety by reference. Also disclosed therein is a visual user interface for service selection.

At present, the problem of charging communications users is a formidable technical challenge. Long gone are the days when it would have been possible to consider manual administration of accounts. Some of the issues involved are discussed in the British Telecommunications Engineering Journal, Volume 11, Part 4, January 1993 "Special issue on billing". In that issue, some figures for the billing system operated by British Telecommunications plc are given as follows:

The system supports 23 million customers and produces 100 million bills a year. The bills itemise 15 million calls a day, and charge a revenue of £24 million per day. The billing system runs on 29 mainframe computers, and requires 1400 gigabytes of data on magnetic disks; 5 million lines of COBOL statements; 14 million screen exchanges every day; and 60 thousand connected terminals. At page 296 of that issue, it is disclosed that it is anticipated that 1.5 gigabytes of data need to be transferred through the network every night solely for the purpose of billing.

It will be apparent that the cost of billing is substantial. It has been estimated at over 10% of the revenue of many telecommunication companies, and much more than this in some cases. It seems likely that the cost and required complexity of billing systems will continue to increase in future, with the provision of ever wider ranges of telecommunications products and services and the proliferation of special rates and tariffs.

It is, of course, known (e.g. from GB 2001788) for user apparatus to log transactions, but since reconciliation is performed manually this merely increases the work to be performed by the user.

In EP-A-474 555 there is described multi-media communications apparatus, for example an ISDN terminal, which is configured to provide so-called "communications management reports" so that communications charges and communication history can be used for communications management. The reports are, in effect, enhanced 'journals' of the type produced by most fax machines: they may include the identity (number) of the party with whom communication was achieved, the type of service (video telephony, telephony, etc), the duration, time and date, and cost of the call can all be provided.

In EP-A-402302 there is described a credit card system designed to make the use of credit/debit cards cost effective even for very small value transactions. A vendor of low-cost products or services, such as newspapers, subway tickets, parking vouchers, has a terminal with a conventional credit card reader and an associated memory. When a user wants to use his credit card to buy a low-cost item, the card is read as usual, but a sum of money much greater than the cost of the item is "transferred" from the computer of the credit/debit card issuing authority. The amount of this sum of money is stored in the memory of the retailer and is associated in the memory with the number of its relevant card. The cost of the item purchased is deducted from that stored sum. The next time that customer wants to buy a subway ticket from that vendor, he/she uses the credit card. This time, rather than again having to make a call to the computer of the credit/debit card issuing authority, the cost of the item is simply deducted from the amount held in the relevant memory section of the vendor's terminal. Only when there is insufficient credit in that memory section to fund a desired payment does the terminal again contact the computer of the card issuing authority for a further, relatively large, transfer.

In EP-A-0341219 there is described an integrated automatic information and telephone point. This apparatus permits of the possibility of requested automatic information services being charged according to the criteria used for the charging of calls from telephone boxes.

In the paper "IC Card-Based Advanced Man-Machine Interface for Public Switched Telephone Network Service", by Mizusawa et al, published in Electronics and Communications in Japan, Vol.73, 1990, No.1, Part 1, pages 36–54, there are described various applications of smart cards. In particular, the paper is concerned with personal numbering. Conventional PSTN service records are briefly discussed.

In EP-A-0325564 there is described a technique to permit a remote computer terminal to display images relevant to alphanumeric data passed to the computer over a low bit-rate link, without the usual problems associated with image transmission over low bit-rate links. This is achieved by storing relatively large image-elements in the computer's memory, which elements are then picked out and assembled in accordance with simple instructions transmitted to the computer in association with the relevant alphanumeric data.

In the article "Telescript: the emerging standard for intelligent messaging", by J Hanckmann, published in PTR Philips Telecommunications Review, Vol.52, 1994, No.1, pages 15–19, there is described what are termed 'remote procedure calls', which make use of software agents. So-called 'smart messages' are described in which a correspondent can send messages that contain smart buttons. The message appears on the screen of the receiving device and, when the recipient clicks on the button, an action is performed.

SUMMARY OF THE INVENTION

The present invention is intended to provide communications apparatus which offers the possibility of controlling the complexity of billing operations.

Accordingly, in one aspect, the invention provides a service user apparatus arranged to automatically log service transactions, and service provider apparatus arranged to transmit account data through a communications network, the user apparatus being arranged to compare the account data with stored transaction data and to reconcile the two.

In another aspect, the storage and/or comparison operations may be carried out by independent apparatus not owned either by the service supplier or the service user.

In the event of successful reconciliation, payment may be initiated (e.g. by a "smart-card" held at the user apparatus).

Several advantages are achieved by the distribution of the account storage operation to the user apparatus. Firstly, data storage becomes more distributed, and hence the bottlenecks associated with storage of vast amounts of data centrally with the telecommunications suppliers (as at present) are reduced. Thus, this aspect of the present invention provides the technical benefits of parallel data processing.

There are also secondary benefits, since the customer is more easily able to rely upon accounting data which has been stored by his own apparatus, and is able also to process the stored data for his own purposes (for example, further distribution or charging of the cost).

According to a further aspect of the invention, the same technical principles may be applied within a network, to distribute the billing and accounting within the network rather than centralising it as at present.

In a further aspect of the invention, use is made of periods of low communications usage to transmit accounting information through the network.

In a further aspect of the invention, which may be used independently of the earlier aspects, the services to be acquired by customer equipment are described by codes communicated between customer equipment and supplier equipment via a communications channel, the codes being structured to permit comparison and selection between similar services. For example, the codes may, in one embodiment, specify functional attributes of the service in such a manner as to be descriptive of other services possessing those attributes. Additionally or alternatively, the codes may be hierarchically structured, consisting of both a generic and specific description of the service the subject of each code.

Thus, in this aspect, the comparison of similar but non identical services by customer equipment is facilitated, thus improving the negotiation processes described in our above referenced international application.

In a further aspect of the invention, which is preferably but not necessarily operated in conjunction with the preceding aspect, customer terminal apparatus for the acquisition of services (e.g. telecommunications services) or goods includes a visual interface which displays, for each service, a representative image "icon"), the different icons associated with different services being represented consistently so that similar services are similarly represented. Preferably, attributes of services are represented consistently, so that all icons representing a particular service type (for example video telephony) all have an identical common portion visually representing that service. Preferably, the customer terminal is arranged to display the icons in succession, the position in the succession of different icons being dictated by their similarities, so that a user of the terminal equipment may "browse" through a sequence of similar services represented by visually similar icons.

This aspect of the invention renders it possible to select between a very large number of different services which may be available in future via telecommunications media.

Other aspects and embodiments of the invention are as described or claimed hereafter, with advantages that will be apparent from the following.

BRIEF DESCRIPTION OF THE DRAWINGS

The invention will now be described, by way of example only, with reference to the accompanying drawings in which:

FIG. 13 is a block diagram showing schematically the functional elements of the service provider apparatus of FIG. 12;

FIG. 14 is a diagram showing the structure of a signal utilised in the fourth embodiment of the invention; and FIG. 15a and FIG. 15b show in greater detail the structure of portions of the signal of FIG. 14;

DETAILED DESCRIPTION OF EXEMPLARY EMBODIMENTS

First Embodiment

Figure 1:
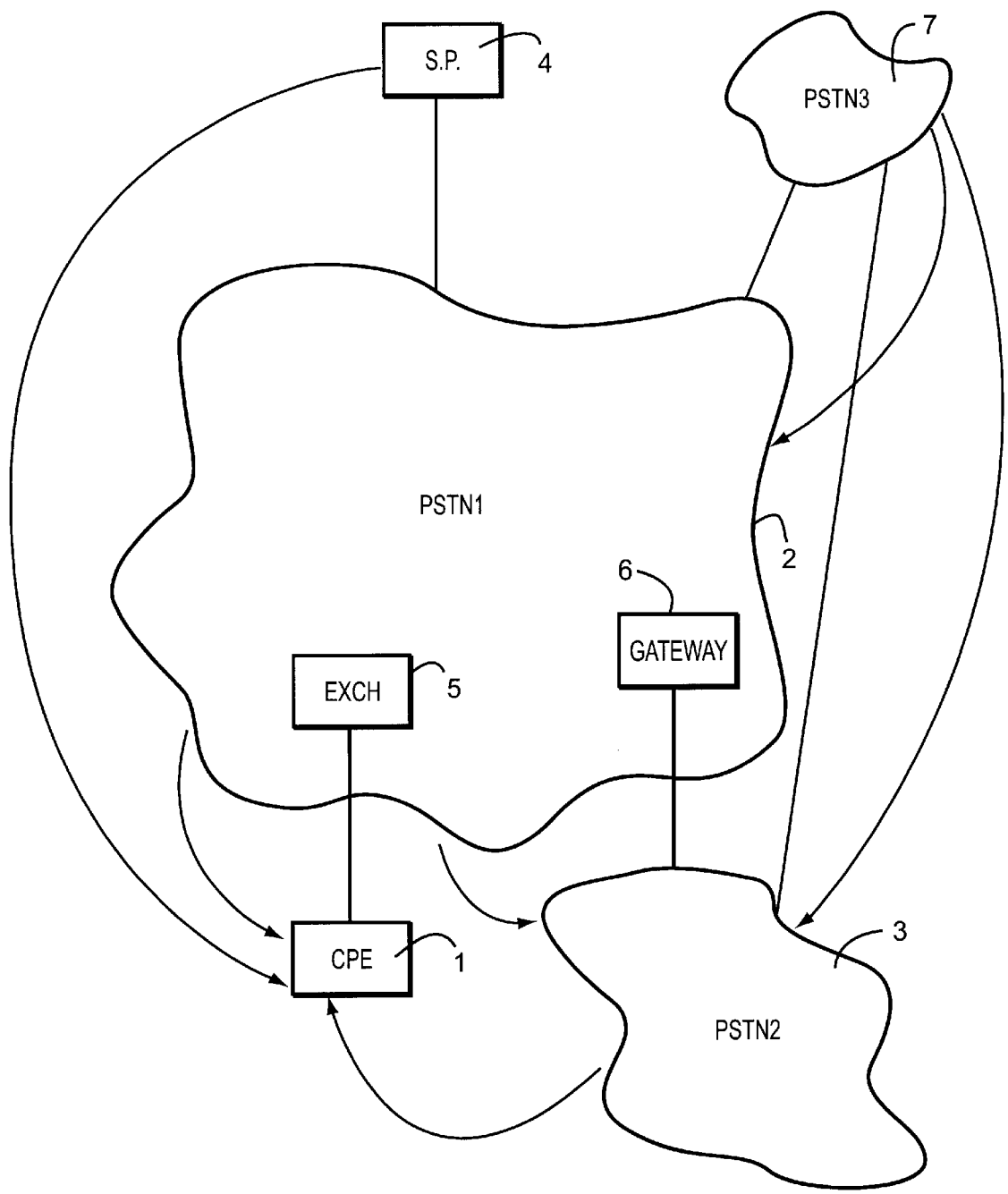
FIG. 1 is a block diagram showing a conventional connection arrangement between a customer and several telecommunications networks.

Referring to FIG. 1, in a telecommunications system (for example, the telecommunications system of the United Kingdom), customer premises equipment 1 (for example a telephone or a computer terminal incorporating a modem) is connected to a first pulse switch telephone network (PSTN) 2, and (via the network 2) to a second public switch telephone network 3. Via the networks 2, 3 the customer terminal 1 is connected to a service provider 4 (for example a database host).

With the PSTN 2, the customer terminal 1 is connected to an exchange 5, which is connectable to a gateway 6 linking to the second PSTN 3. A foreign telephone network 7 may be accessed from the customer terminal 1 via the first or second networks 2, 3.

In FIG. 1, straight lines indicate physical interconnection between apparatus, and curved arrows indicate billing flows. Typically, the operator of the first network 2 sends the customer 1 a quarterly or, in generally, periodic bill for his usage of the network. The operator of the second network 3 sends the customer a bill for his usage of the second network. Since the terminal 1 is connected to the second network 3 via the first network 2, the first network 2 sends a bill to the second network 3 for a connection charges. The service provider 4 sends the customer a bill for his use of the services. The operator of the foreign network 7 bills the operators of the first or second networks 2 or 3.

In the first embodiment, the same physical connections may exist as in FIG. 1. However, the billing process differs from that known in the art.

Figures 2, 3:
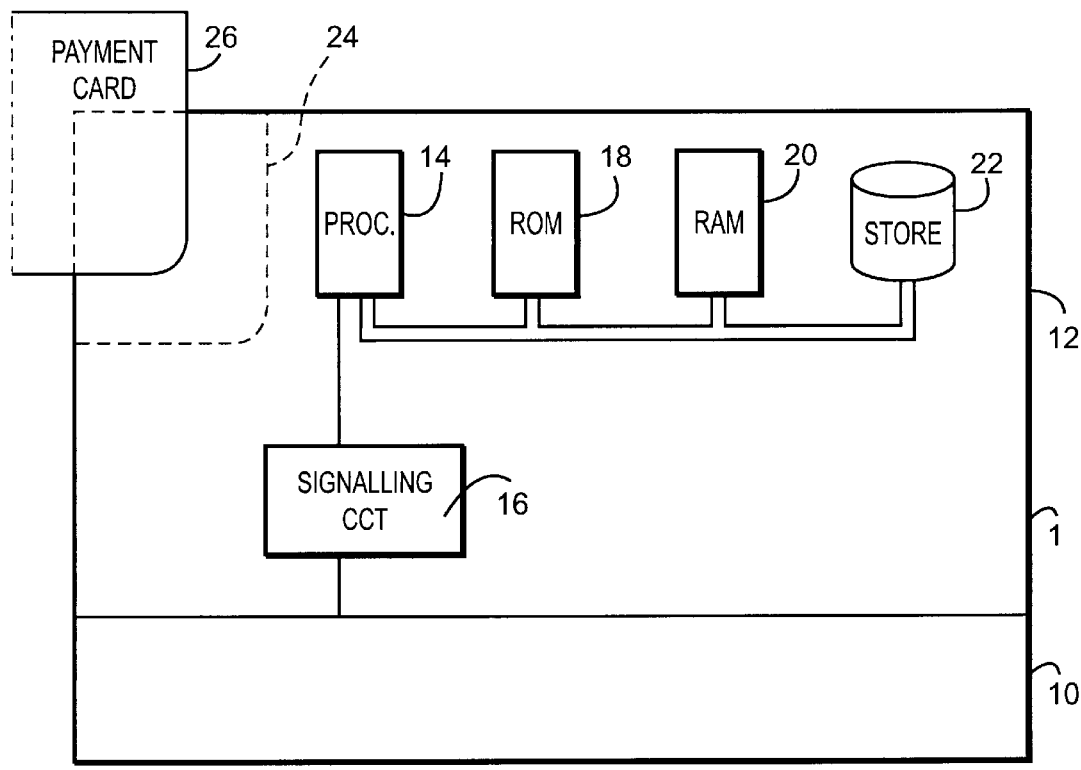
FIG. 2 is a block diagram of customer terminal equipment according to a first embodiment of the invention.
FIG. 3 is a diagram showing schematically the contents of a store forming part of FIG. 1.

Referring to FIG. 2, the customer terminal 1 comprises a conventional telephone signalling apparatus 10, for example, comprising the conventional elements for dialling a number, signalling with the exchange 5 and transmitting and receiving audio.

Also comprised within the terminal 1 is a communications accounting unit 12 according to this embodiment. The accounting unit 12 comprises a processor 14 connected, via a signalling circuit 16, to the telephone unit 10 so as to transmit dialling and signalling information from the processor 14 to the exchange 5; programme storage memory 18 for operating the processor 14; working memory 20 for use by the processor 14; a storage device 22 capable of retaining information over long periods of time; a card reader device 24 arranged to accept and communicate with a payment card 26 and to communicate with the processor 14. The processor 14 may be a micro processor or micro computer and, in the latter instance, may incorporate the memories 18, 20 in a single chip device. The store 22 may be a flash programmable EPROM, a disk drive, or any other type of permanent memory; advantageously, it may be a write once read many (WORM) storage device.

The apparatus shown in FIG. 2 may operate in accordance with embodiments of our above referenced international application; that is to say, it may be arranged to receive from the exchange 5 a price signal indicating a price to be charged for telecommunications services (or other services), and store these price signals. Alternatively, or additionally, the accounting unit 12 may contain store details of the payment rate for given services in the memory 18 (for example, the price per unit of telephone calls).

The processor 14 contains a timer circuit which is arranged to track the date and time, and to monitor the duration of (or, in general, the amount of usage of) telecommunications services received by the equipment 10.

Referring to FIG. 3, the processor 14 is arranged to write into the store 22 a record 221 for each service acquired by the terminal apparatus 1. The record 221 typically comprises fields 222–228 respectively for date, time, price rate, duration of services (or, in general, quantity of services whether measured in minutes, units, bits or frames), total cost, a description of the service, and an identification of the designation or other descriptor identifying the purpose of acquiring the service.

The store 22 may also store long term subscription or rental charges, where these exist.

Preferably, the records 221 are grouped in tables (1 table 229 is shown), each table being associated with a different service provider. Thus, in the example of FIG. 1, the separate tables in the store 22 would be provided for the network 2, the network 3, and the service provider 4.

On each occasion on which the terminal equipment 1 utilises telecommunications services from the network 2, or the network 3, or service available via the network from the service provider 4, a new record 221 is created in the appropriate table 229 in the store 22 indicating the date, time, duration (or, in general, amount), description and designation of the services, and an indication of the unit price (derived either by a price signal received at the terminal apparatus 1 as disclosed in our above referenced international application, or from pre-stored data in the memory 18), and the total cost of the services acquired (obtained by multiplying the price stored in the field 224 and the duration stored in the field 228).

Figure 4:
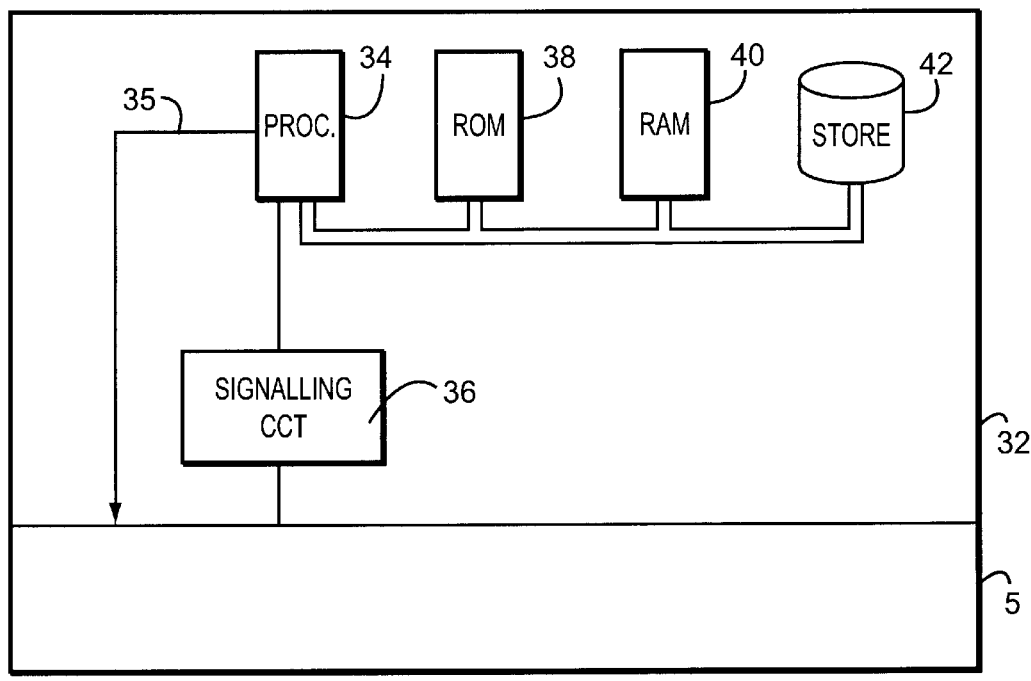
FIG. 4 is a block diagram showing the structure of network service provider equipment according to the first embodiment.

Referring to FIG. 4, (at the exchange 5 and within the service provider equipment 4 and the network 3) is provided accounting apparatus 32 comprising a processor 34, a signalling circuit 36 connected to the exchange 5, and to the processor 34, a control bus 35 interconnecting the processor 35 and the exchange 5, a programme storage memory 38, a working memory 40, and a store 42, all interconnected with the processor 34.

At the exchange 5, and likewise at a point within the network 3 and service provider 4, the processor 34 is arranged to write a record to the store 42 corresponding to the record shown in FIG. 3, or each occasion on which services were provided. The records in the store 42 are grouped into tables, one for each separately identified customer. The processor 34, memories 38 and 40 and store 42 may in practice form suitably programmed elements of the existing computing apparatus at an exchange 5, rather than being separate thereof as shown in FIG. 4.

Via the instruction bus 35, the processor 34 may activate a diagnostic check of the exchange 5 equipment, or the line between the exchange 5 and the customer terminal 1, and/or elements of the customer terminal 1.

Via the signalling circuit 36, the processor 34 can transmit messages through the exchange 5 to the customer terminal 1 and receive messages therefrom.

Figure 5A:
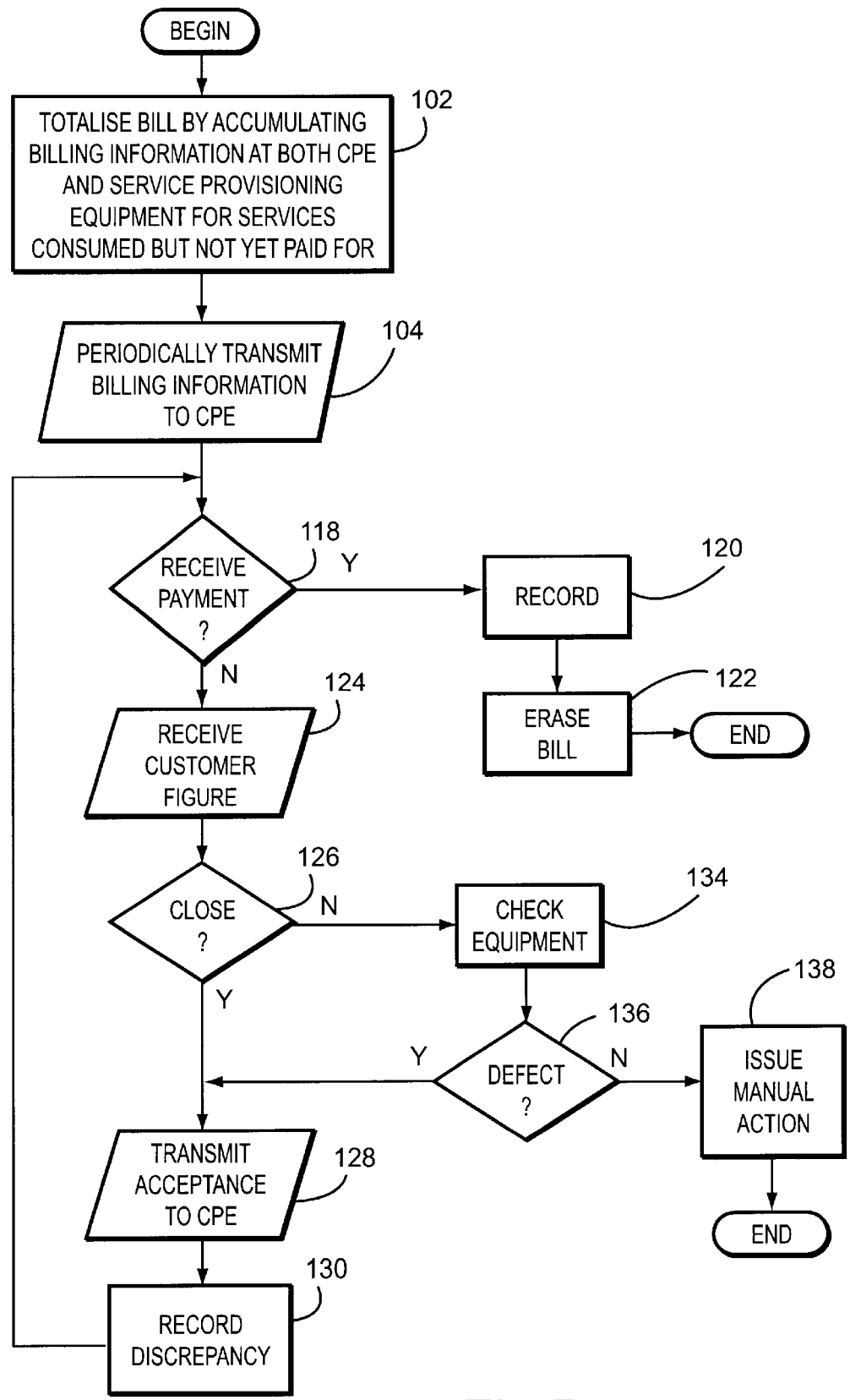
FIG. 5a is a flow diagram showing the operation of the equipment of FIG. 4.
Figure 5B:
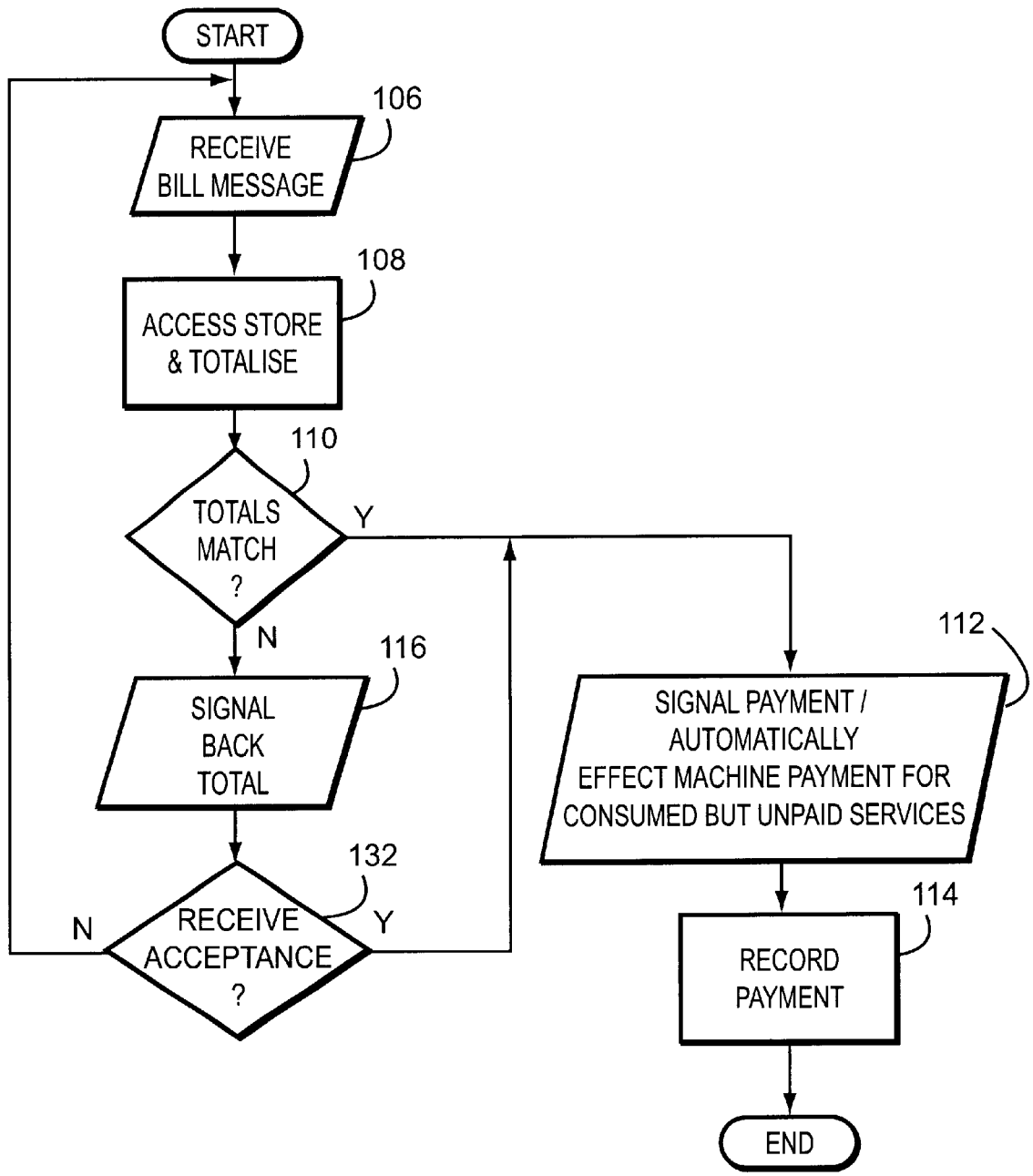
FIG. 5b is a flow diagram showing the corresponding operation of the equipment of FIG. 2.

Referring to FIGS. 5a and 5b, operation of a first variant of this embodiment will now be described.

As described above, the customer terminal 1 utilises the telecommunications services available from the network 2 and, on each such utilisation, a record 221 is stored by the processor 14 in the store 22 at the customer terminal 1 and a corresponding record is stored by the processor 34 in the store 42 in the network accounting apparatus 32.

At a convenient point in time (for example, at 3.00 a.m. each Sunday morning) the processor 34 reviews the table stored for the customer terminal 1 in the store 42 and, in a step 102, adds the total costs of each service record to reach a total cost figure. Next, the processor 34 (via the signalling circuit 36 and exchange 5) transmits to the customer terminal 1 the message indicating the total amount due for payment in a step 104. Audio or out of band signalling, or any other convenient signalling method, may be used.

Referring to FIG. 5b, in a step 106 the processor 14 receives the bill message via the telecommunications terminal apparatus 10 and signalling circuit 16, and in a step 108 the processor 14 reads the store 22, accesses the fields 226 of the table 229 for the first network, totals the cost figures, and compares the total thus derived with the amount due figure received from the exchange 5, in steps 108 and 110 respectively. In the event of an exact match between the amount due message and the total from the store 22, or in the event of an insignificant difference (e.g. on the order of 1 or 2% due, for example, to rounding errors) the processor 14 instructs the card reader 24 to debit the payment card 26, and signals payment to the exchange 5 in step 112. For additional security, an exchange of password signals may precede this state. The processor 14 then amends the records 221 in the table 229 to indicate that payment has been made, in a step 114.

On the other hand, in the event of a significant discrepancy between the amount due signalled from the network 2 and the total recorded in the store 22, the processor 14 is arranged, in a step 116, to signal back to the exchange 5 a message indicating the total read from the store 22.

Referring back to FIG. 5a, in the event that a signal indicating payment is received (step 118) by the processor 34, the payment is recorded in step 120 in the memory 40 and the service records in the store 42 for the customer terminal 1 are erased, to conserve space in the store 42, in a step 122. At some further convenient stage, the stored payment record is signalled by the processor to a financial institution to be entered in the account of the capacitor of the network 3.

In the event that payment is not received in step 118, the processor 34, via the signalling circuit 36 and exchange 5, receives the total figure transmitted by the processor 14 in step 124.

In the event that the total figure signalled from the customer terminal 1 is close (within a threshold percentage, for example 10%) to that indicated by the records stored in the store 42, the processor 34 may accept the total transmitted from the customer terminal processor 14 as being sufficiently accurate, and transmit, in a step 128, a signal to the customer terminal 1 indicating acceptance of the total held at the customer terminal 1. The discrepancy between the two totals is stored in the store 42, and is used in future comparisons in the step 126 for that customer terminal equipment 1 to reduce the percentage deviation between the two totals that will be acceptable in future comparisons. In the event of systematic and regular deviations, an equipment fault is likely and the processor 34 is arranged to signal the desirability of an equipment check or replacement.

After recording the discrepancy in step 130, the processor 34 returns to step 118 to await payment.

Returning to FIG. 5b, where the processor 14 receives an acceptance signal from a processor 34 in step 132, it proceeds to step 112 to initiate payment of its total, and the network accounting equipment 12 proceeds from step 118 as described above.

Returning to FIG. 5a, in the event that the comparison 126 reveals a significant difference between the two totals, or where (as discussed above) smaller but consistent discrepancies are found from a given terminal apparatus 1, the processor 34 instructs the exchange equipment 5, via the control bus 35, to initiate a line check on the equipment between the exchange 5 and the customer terminal equipment 1, in step 134. In the event that the line check reveals a defect in step 136, the processor 34 proceeds to step 128 to accept the figure proposed by the customer terminal equipment accounting unit 12. In the event that no defect is found, in step 138 the processor 34 generates an alarm (for example in the form of a printed letter) to alert the customer and the network operator to the discrepancy.

Figure 6A:
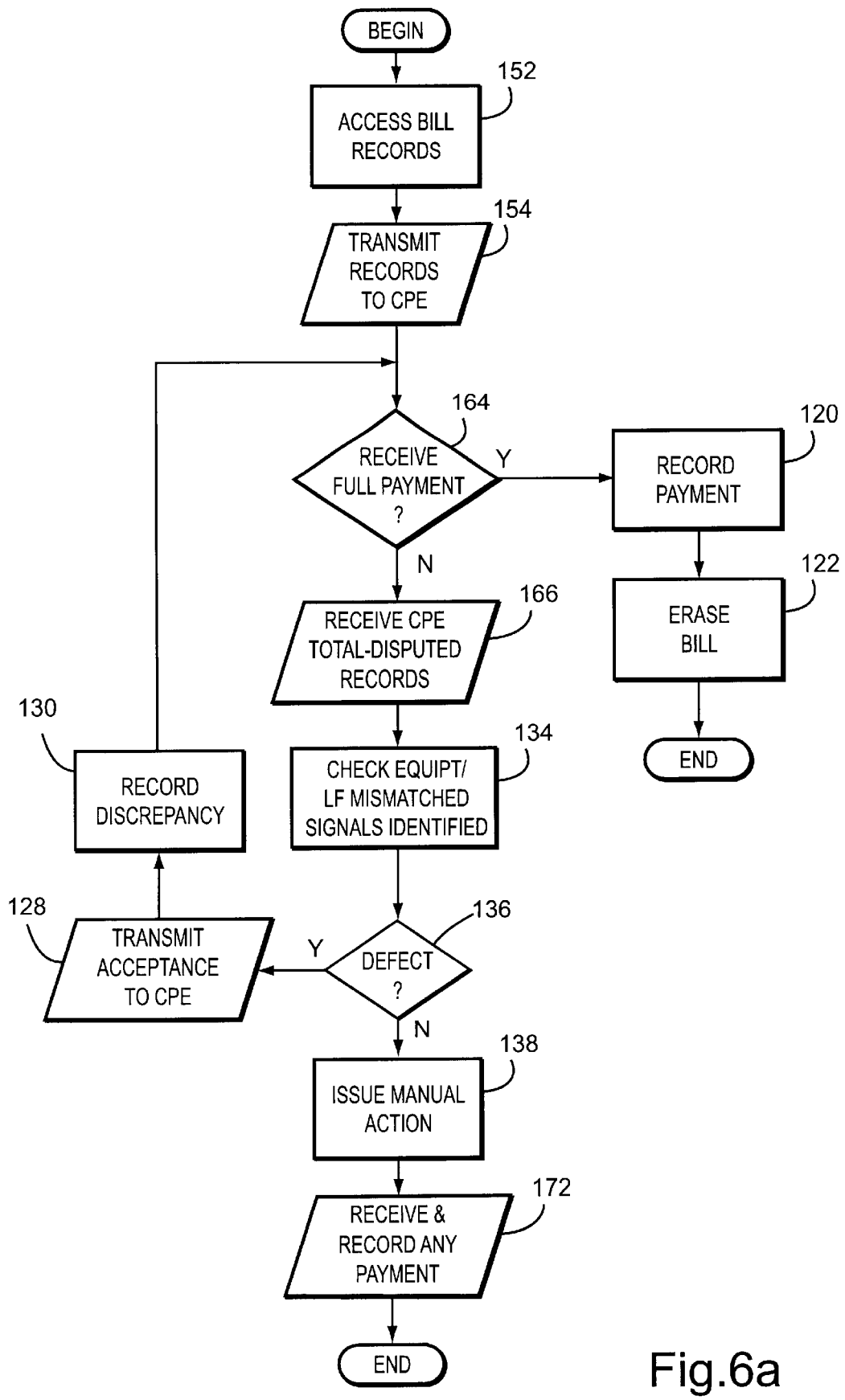
FIG. 6a is a flow diagram corresponding to FIG. 5a and showing the operation of the apparatus of FIG. 4 in a modification of the first embodiment.
Figure 6B:
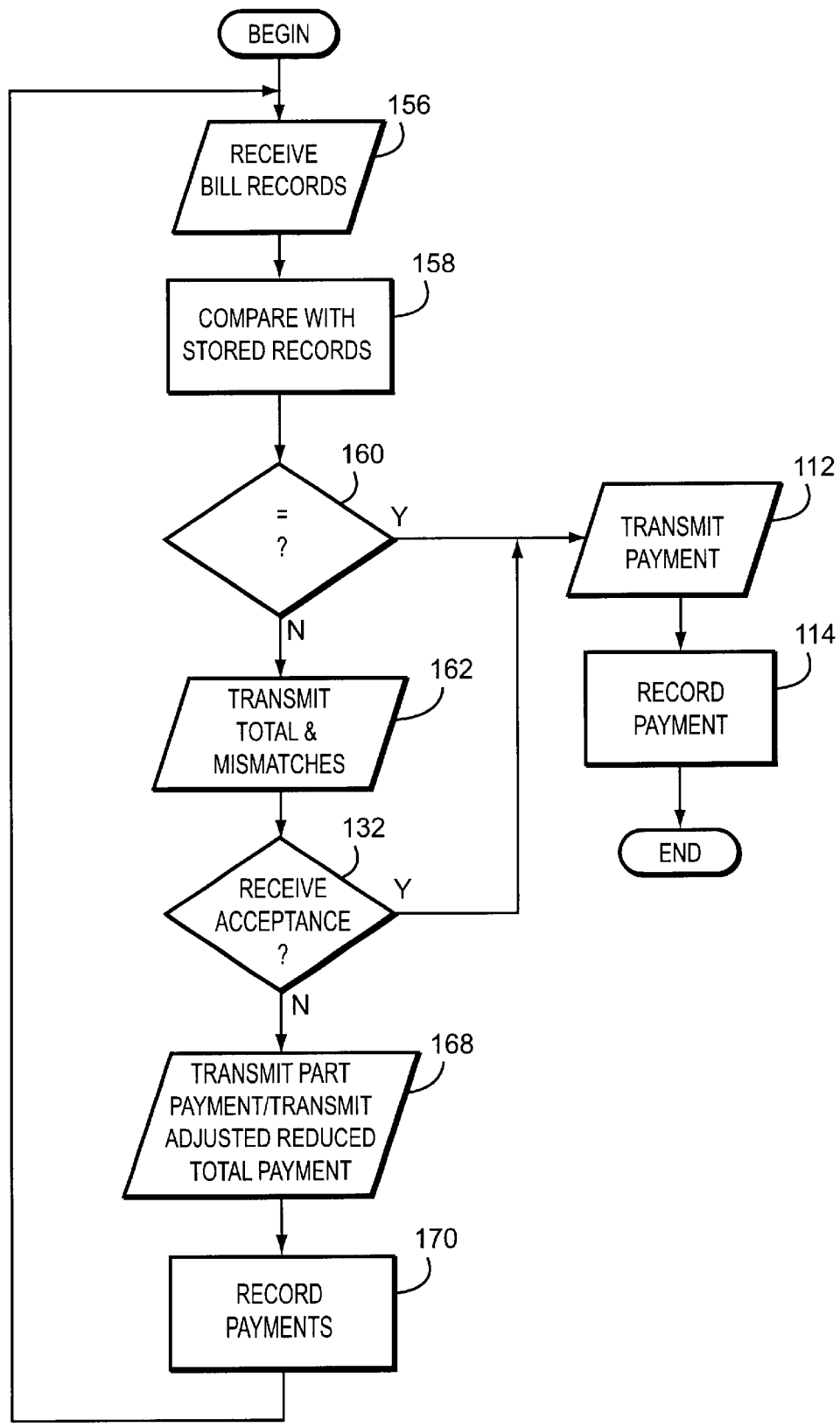
FIG. 6b is a flow diagram corresponding to FIG. 5b and showing the operation of the apparatus of FIG. 2 in that modification.

It will be recognised that the description given above with reference to FIGS. 5a and 5b is only one way of implementing the invention. An alternative variant will now be described with reference to FIGS. 6a and 6b, in which the same reference numerals are used as in FIGS. 5a and 5b to denote equivalent operations, the description of which will not be repeated.

In step 152, the processor 34 accesses the store 42 in the same manner as described with reference to step 102. Instead of, or in addition it, totalising the costs, the processor 14 transmits the entire file of records of service transactions held in the store 42 for the terminal equipment 1, in step 154, via the signalling circuit 36 and exchange 5, to the customer accounting apparatus 12, at which the processor 14 receives the bill records in step 156 and compares the records with those stored in the table 229, in step 158. The transmitted records may, for example, be sent in identical format to that in which the records 221 are held in the table 229 in the store 22, so that a simple byte comparison may be performed by the processor 14.

If, as a result of the comparison operation 160, the two records are identical then the processor 14 transmits and the processor 34 receives, payment in steps 112 and 120 respectively, exactly as described above.

If, in the step 160, some or all of the transmitted records are found not to be identical, then in step 162 the processor 14 transmits back the total of the prices in fields 226 in the memory 22, together with data identifying those records in which the discrepancies occurred, in step 162.

At the network accounting apparatus 32, if full payment is not received in the step 164, the processor 34 reads, in step 166, the total calculated by the customer terminal 1 and locates those records in the store 42 which are in disagreement with those in the store 22. At this stage, if only a minor discrepancy exists, the processor 34 may act in the same manner as in the first embodiment. In the event of significant discrepancy, however, the processor 34 as before instructs exchange 5 to conduct an equipment test. In this instance, since the destination of the disputed transaction can be identified from the record in the store 42, the equipment check in step 134 may additionally check the portions of the network 2 between the exchange 5 and the destination (for example, 4).

As before, if in step 136 a defect is identified, the total figure signalled by the customer terminal accounting apparatus 12 is accepted and acceptance is transmitted in step 128, whereas in the event that no defect is detected, the processor 34 may issue a warning or otherwise instruct manual action between the network operating personnel and the customer, in step 138.

If no acceptance is received in step 132 by the processor 12, the processor 12 in this embodiment totals the cost fields 226 for those records for which correspondence was found in the step 160, and transmits a part payment in step 168, and records payment against those records in step 170. The part payment is recorded in step 172 by the processor 34, but the billing records in the store 42 are not erased in this case.

The features of the methods 5 and 6 may be combined; for instance, if a discrepancy between totals is found in the embodiment of FIG. 5, the processor 32 may commence operation of the embodiment of FIG. 6 to enable a fuller check of records to be made at the customer terminal accounting apparatus 12.

Many variants to this embodiment are possible. For example, the network accounting device 32 may transmit only selected records to the customer terminal device 12, to enable "spot checking", or the processor 12 may receive all records from the processor 34 but may only compare randomly selected records as a "spot check".

Rather than initiating payment through a "smart card" payment may be initiated through a credit card or other electronic payment method, or the processor 12 may signal to a financial institution to effect payment.

Alternatively, the act of payment may be separated from the above described process of account reconciliation, and may take place at a later date. For example, after reconciliation, payment may be effected by direct debit from the account of the customer by the operator of the network 2.

Equally, rather than transmitting a plurality of records at a time after the provision of services, the reconciliation process may, for each occasion of service provision, be provided as a handshaking operation at the end of provision of the service, so that accounts are reconciled as services are provided. In this case, there may be no need for the store 42 at the exchange 5.

Although the foregoing description has been provided in terms of the provision of telecommunications services, it will be apparent that the customer terminal accounting unit 12 could additionally, or alternatively, be employed to monitor the provision of services which are available through a telecommunications network from a service provider 4. In such cases, the service provider 4 would dial through the network to reach the customer terminal 1 to submit billing messages, but in other respects the foregoing description is applicable.

It would be possible to integrate all the functions of the customer accounting unit 12 onto a smart card comprising a processor and memory, and being insertable into a card reader in a handset (for example, a digital mobile cellular radio handset), so as to allow the billing information to travel with the user.

It will be seen that the foregoing embodiment achieves the distribution of the accounting data to customer equipment rather than, as is conventional, holding the data within a computer connected to the network 2. By periodically reconciling the data held by customers with that held by the network 2, the amount of data to be held by the network 2 may substantially be reduced and, furthermore, bottlenecks in communicating information to central billing points in the network can be achieved. It is also possible for the owners of the terminal equipment 1 to make further internal use of the accounting data held in the store 2, for example to bill parts of a single business or ultimate customers, or to monitoring control costs.

The volume of data to be transmitted to each customer terminal apparatus 1 depends upon the amount of usage thereof, and the frequency of transmission of billing information may be controlled by the processor 34 to occur on reaching a total cost payable threshold, rather than at regular intervals.

To make best use of network resources, the processor 14 is preferably arranged to transmit billing information messages at times of low usage of the communications link to the customer terminal 1. Typical low usage times are overnight and at weekends. However, the processor 14 is preferably arranged to sample the time of usage of the customer terminal equipment 1, for example by monitoring the exchange 5, (or the contents of the store 42), and thus to predict, on the basis of past usage of the customer terminal 1, or the local network as a whole, suitable times for transmission of billing information.

It is not necessary that the network accounting device 32 be held at the exchange 5 to which the customer terminal 1 is connected, but in practice this is an advantageous and convenient position for the network accounting unit 32 ("position" will be understood to refer to electrical connection, rather than physical location), since it is generally straightforward to establish from this exchange 5 the destination and description of services provided to the terminal 1, and the path through the network 2 through which billing information is transmitted to the terminal 1 is minimised, thereby minimising the congestion within the network 2.

It will be apparent that the foregoing is applicable not only to fixed link terminal equipment but also to any of the embodiment described in our above referenced international application (for example mobile telephony, multi media services, data transfer and so on) or data communications networks (for example LANs).

Although it is not limited thereto, it is particularly preferred to employ the present invention with the invention described in our above referenced international application (of transmitting price signals associated with each transaction). When the two inventions are combined, the discrepancy information stored in the above embodiment may be utilised in setting prices for future services, since if systematic underrecovery of bills is to be expected from a given customer it would be desirable to negotiate a higher price.

Although the above described embodiment discusses a customer terminal equipment 1, it will immediately be clear that exactly the same principle is applicable to the interconnection between two networks; for example the interconnection between the networks 2 and 3 of FIG. 1. In such a case, apparatus might be provided in each network which performs the functions both of the supplier accounting unit 32 and of the customer accounting unit 12. In this embodiment, rather than directly transferring funds, each network may allow the other credit against the others account, so as to reduce the level of any funds payable, if the networks 2, 3 make reciprocal use of each other resources.

Second Embodiment

Figure 7:
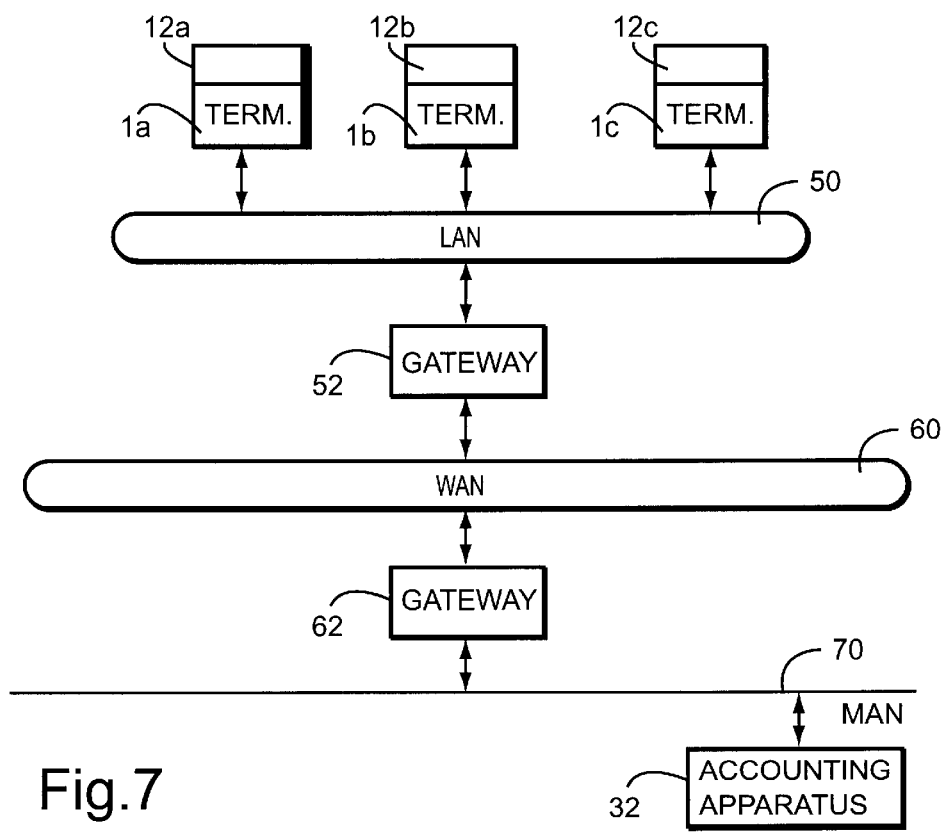
FIG. 7 is a block diagram showing the arrangement of hierarchical networks in a second embodiment of the invention.

In this embodiment, a communications network is divided into a hierarchy of networks. Referring to FIG. 7, plurality of customer terminal apparatus 1a, 1b, 1c (each comprising, for example, a computer workstation equipped with a modem) are each provided with a corresponding accounting device 12a, 12b, 12c respectively, of the type illustrated in FIG. 2, the processor 14 and memory 18, 20 thereof being comprised by the CPU and memory of the work station, and the signalling circuit 16 thereof being comprised by the modem of the work station. The terminals 1a–1c are each connected to a Local Area Network (LAN), over which they communicate for example in TDM fashion. The LAN 50 has a gateway unit 52 for connection to a wide area network (WAN) 60. The wide area network 60 has, in turn, a gateway unit 62 for connection with a still wider network 72, such as a metropolitan area network (MAN) or information superhighway (e.g. the INTERNET) or a telecommunications network.

Figure 8:
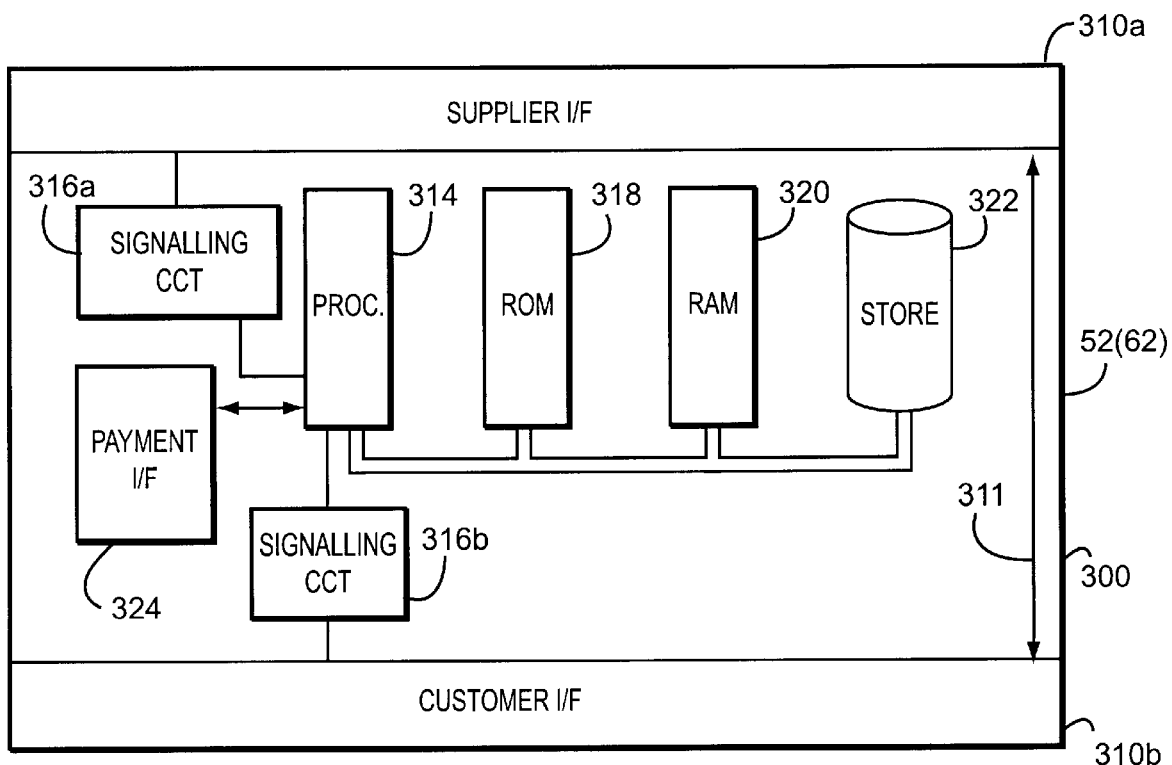
FIG. 8 is a block diagram showing the structure of interface apparatus forming part of FIG. 7.

Referring to FIG. 8 each of the gateways 52 or 62 comprises a customer interface side 310b (which, in the case of the gateway 52 communicates with the LAN 50; in the case of the gateway 62 communicates with the WAN 60); a supplier interface 310a (which in the case of the gateway 52 communicates with the WAN 60 and in the case of the gateway 62 communicates with the MAN 70), together with a communications channel 311 linking the two. Also provided is an accounting unit 300, comprising a signalling unit 316b for interconnecting a processor 314 with the supplier interface 316a and a signalling unit 316b for connecting the processor 314 with the customer interface 310b circuit. In communication with the processor 314 are programme and data memories 318, 320 and a store 322 (preferably a non-volatile store, for example an EEPROM or a mass storage device such as disk drive). The processor 314 is also connected to a payment interface 324, which may comprise a smart card reader as in FIG. 2, or alternatively may comprise a connection for instructing payment from a financial institution, or any other means of initiating an electronic or other payment transaction.

Connected to the MAN 70 is an accounting unit 32 of the type shown in FIG. 4.

In the operation of this embodiment, if one of the terminals 12 wishes to utilise the LAN 50, the accounting circuit 300 in the gateway 52 and the accounting apparatus 12 in the terminal each store corresponding service records in the stores 322, 22, and the accounting circuit 300 periodically sends a billing message to the terminal accounting apparatus 12 as disclosed in the first embodiment.

On the other hand, if the customer terminal 1 wishes to utilise the WAN 60, access is provided via the gateway 52. A record is created by the accounting unit 300 of the gateway 52 in the store 332, indicating both the cost to the customer terminal 1 and the cost that which will be charged by the WAN 60.

The accounting unit 300 in the gateway 62 creates a record in its store 322 storing the price to be charged to the LAN 50. Periodically, the accounting apparatus 300 of the gateway unit 62 of the WAN 60 generates, in the manner of FIGS. 5a or 6a, a billing signal to initiate a charging transaction to the gateway unit 52 (in common with other customers connected to the WAN 60). The accounting unit 300 of the gateway unit 52 correspondingly follows the process or FIG. 5b or FIG. 6b and, where the account records match, initiates payment from the payment interface 324. At a convenient subsequent point, the accounting unit 300 of the gateway 52 then bills the customer terminal equipment 1a which utilised the service, performing the process of FIG. 5a or FIG. 6a, and the corresponding customer accounting apparatus 12a follows the process respectively of FIG. 5b or FIG. 6b in reconciling the its record in the store 22 with that held in the store 322 of the account unit 300 of the gateway 52. Once the record held in the store 322 of the gateway unit 52 has booth been paid to the supplier (WAN 60) and billed to the customer (customer terminal 1a) it can be erased from the store 322.

In exactly the same way, where one of the user terminals wishes to utilise services of or via the MAN 70, connection is provided via the gateway 52a, the WAN 60, the gateway 62 and the MAN 70, and billing records are created in the accounting apparatus 32, 62, 52 and 12a. Subsequently, the accounting apparatus 32 bills the accounting apparatus 300 of the gateway 62, the two apparatus following respectively FIGS. 5a and 5b or 6a and 6b, and subsequently the accounting unit 300 of the gateway 62 re-bills the service on as described in the above to the gateway unit 52, which re-bills bills the customer terminal 12.

In each case, records need only be maintained in the store of each service provider until the service has been billed to the immediately lower level in the hierarchy.

It will be evident from the foregoing that this hierarchical arrangement of networks could be further extended, for example, to global networks to which the MAN 70 is connected, or, at the other end of the hierarchy, to bill multiple individual users of a single terminal apparatus 1, each user having an individual smart card 26 and a corresponding set of payment and billing records in the store 22 of the customer terminal accounting apparatus 12.

Equally, as with the preceding embodiment, the different layers of the hierarchy 50, 60, 70 need not be separate economic entities but might be convenient organisational divisions of a single economic entity; in this case, actual payment may not need to take place except between the customer at terminal apparatus 1 and the network to which it is connected.

Third Embodiment

In the preceding embodiments, accounting apparatus was provided as part of the customer equipment, and the reconcilation was performed at the customer equipment. In the present embodiment, additionally or alternatively, a record of the call is made on apparatus which is independent of either the customer of the supplier, and is accessed either for confirmation of the reconciliation performed by the customer, or for the purpose of performing reconciliation of the amount payable instead of the customer.

Figure 9:
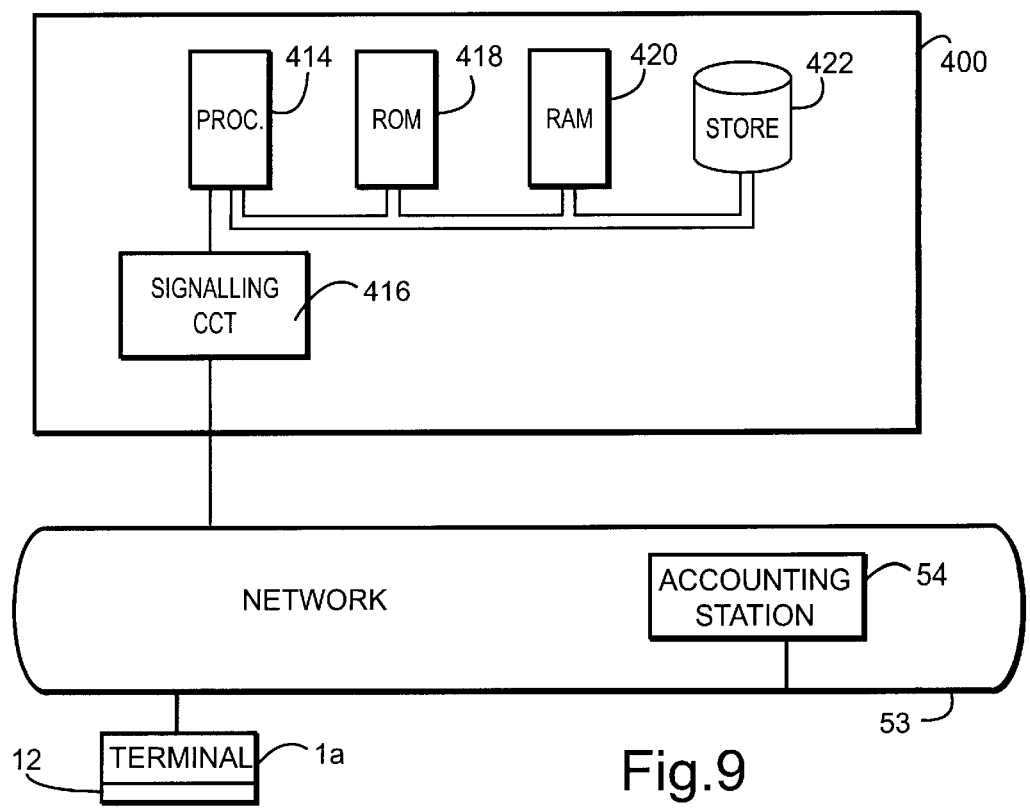
FIG. 9 is a block diagram showing schematically the arrangement of components of a network according to a third embodiment of the invention.

Referring to FIG. 9, a network 53 (which may, for example, be an optical transmission network utilising wavelength division multiplexing and operating under asynchronous transfer mode (ATM) or synchronous digital hierarchy (SDH) transmission protocols) has an accounting station 54. The network 53 and accounting station 54 may be as described in the preceding embodiment, for example. Connected to the network is customer equipment 1a. Also connected to the network 53 is an independently owned and operated monitoring station 400, comprising a signalling unit 416 for communicating with the network 53; a processor 414 connected to the signalling unit; working and program memory 418;420; and a non volatile store device 422. All of the foregoing may be substantially as described with reference to FIGS. 1, 2 or 8.

The monitor apparatus 400 is arranged to receive and scan all the wavelength channels on the network 53, and to store details of calls or services transferred over the network 53.

In the event that a customer apparatus 1a (operating, for example, in accordance with the first embodiment described above; is unable to reconcile the billing data transmitted from the station 54 with billing data which it holds locally, it may generate a signal through the network 53 addressed to the monitor apparatus 400. On receipt of such a signal, the monitor apparatus 400 is arranged to read the service data stored in the store 422 relating to services received by the customer apparatus 1a, and to signal the data to the customer apparatus 1a and the network station 54, to verify the billing data held by the customer station 1a or that transmitted by the station 54.

The data transmitted by the monitor unit 400 may be the total due in respect of services (calculated as in the first embodiment); or details of selected records of services received; or the entire records of all services received by the customer apparatus 1a.

By providing the monitoring apparatus 400 as a unit connected to the network 53 independently of either the customer apparatus 1a or the control and routing components of the network 53, the monitoring device 400 may be able to gather representative data unaffected by faults at either the customer or the network apparatus. The monitoring apparatus 400 may, for example, be owned or operated by a regulatory authority.

In this embodiment, the data stored in the non volatile storage device 422 is stored so as to be relatively immune to either accidental loss or tampering. The storage device 422 may comprise a short term store and longer term achieve storage, such as optical disc storage or archive tapes, so as to confer greater immunity to accidental loss or damage of data. The service records may be stored in encrypted form, so as to reduce the possibility of deliberate tampering with records or reading or writing of records other than by the processor 414. In a modification, the encryption key for a particular customer may be known only to customer equipment 1a concerned (for example may be recorded on a smart card 26 shown in FIG. 1). In this way, any one customer or supplier apparatus 1a is prevented from accessing the data relating to any other. In this embodiment, preferably, all data may be archived for a period of 7 years or more, so as to be available in the event of subsequent disputes.

To reduce the volume of the data stored in the store 422, several distributed monitoring units 400 may be provided, each responsible for only a limited number of customer equipment 1a or service provides 2, 3, 4. Additionally or alternatively, the monitoring apparatus 400 may store only records relating to a selected subset of services provided; for example, selected on a random basis, or selected to include only services over a certain cost threshold.

It would also be possible for the monitoring apparatus 400 to hold funds in electronic form for the customer apparatus 1a; being authorised, for example, to directly debit a bank account. Thus, in the event that the customer apparatus 1a is unable to reconcile the billing data it receives with that data which it has itself stored, the processor 414 of the monitoring station 400 may calculate an independent total due from the data stored in the store 422, and transmit payment of the amount due to the network accounting station 52 in the same manner as described in relation to the first embodiment, debiting the funds held on behalf of the customer apparatus 1a correspondingly.

In a further extension of this embodiment, the customer apparatus 1a may thereby reduce the volume of data which is stores in its accounting apparatus 12 (for example, to a running total amount due) and relay upon the independent monitoring unit 400 to store reliable records of the services which the customer apparatus 1a has received. Charges may be made for the use of the services of the monitoring apparatus 400 by each customer apparatus 1a; the monitoring apparatus 400 may therefore be regarded as a service provider as in the first embodiment, and may bill for its services through the telecommunications network 50 as described above.

Fourth Embodiment

In this embodiment (which may be combined with the earlier embodiments, or with the embodiments described in our above referenced international application) the services to be acquired by customer equipment are described by a code which is transmitted from supplied equipment to customer equipment via a communications channel, the code being structured to permit comparison and selection between similar services.

Figure 10:
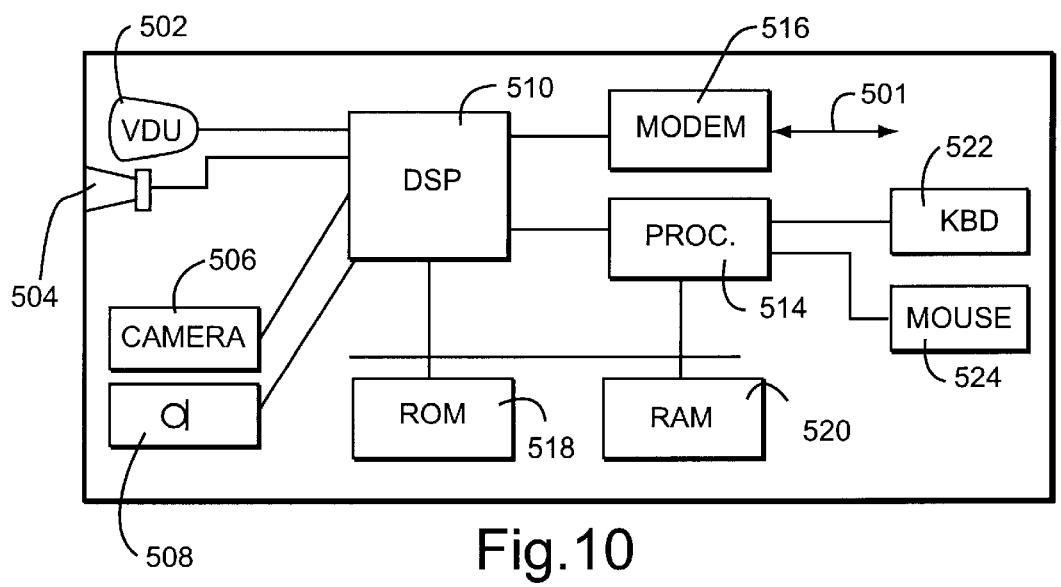
FIG. 10 is a block diagram showing schematically the structure of a user terminal of a fourth embodiment of the invention.

In this embodiment, the customer apparatus is typically a personal computer. Referring to FIG. 10, the customer apparatus 500 therefore comprises a modem 516 in signalling connection with the telecommunications channel 501; a processor 514 coupled to the modem 516 (for example a microprocessor device such as the i-486 or Pentium (TM) processors available from Intel Corporation); a digital signal processor (DSP) device 510 such as the Western Electric DSP 32C available from AT&T; program storage read only memory (ROM) 518; rewrittable memory (RAM) 520; a visual display 502 a loudspeaker 504; a video camera 506; and a microphone 508.

In operation, the DSP device 510 receives analogue inputs from the microphone 508 and camera 506 and from the processor 514; supplies analog outputs to the VDU 502 and loudspeaker 504; and communicates digital data with the modem 516 and processor 514.

A user input device 522 such as a keyboard is also provided, together, optionally, with a position sensitive or cursor control input device 524 (such as a mouse, a track ball or a stylus).

Thus, the DSP device 510 can selectively receive digital data from the modem 516, and process the data and generate therefrom an analog audio signal for the loud speaker 504 or video signal for the visual display unit 502; and likewise receive an analog audio signal from the microphone 508 or video signal from the camera 506 and supply corresponding encoded digital data to the modem 516.

As is conventional, the DSP device 150 may contain on board the necessary analog to digital and digital to analog convertors, as well as program storage memory. The processor 514 is connected to data input and output ports of the DSP 510, so that the DSP 510 can encode data from the processor or decode data to be supplied to the processor; the processor 514 is also connected to a control port of the DSP 510 so as to select a stored programme for performance by the DSP 510, select an output device or an input device for connection to the DSP 510; or supply a new control program to the DSP device 510.

The read only memory 518 stored programme data for controlling the operation of the processor 514, and the random access memory 520 stores working data, or data received from the modem 516, for use by the processor 514 or the DSP 510. The memories 518, 520 are interconnected with the processor 514 and DSP 510 (e.g. via an internal bus structure).

Figure 11:
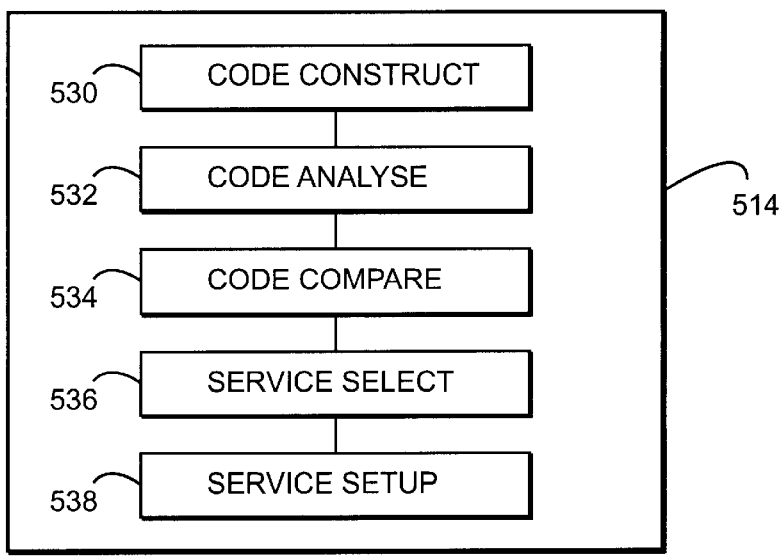
FIG. 11 is a block diagram showing schematically the functional components of the control device forming part of the apparatus of FIG. 10.

FIG. 11 illustrates the principal functions performed by the processor 514 as functional blocks (which would typically be performed by different programmes stored in the read only memory 518, but could in principle be performed by separate hardware).

A code construction function 530 is provided, for constructing a code indicative of a desired service for transmission via the modem 516 and telecommunications channel 501 to service providers. A code analysis function 532 is provided, for receiving codes from the modem 516 from service providers and interpreting the corresponding service offered.

A code comparison function 534 is provided, for comparing received codes with transmitted codes to determine whether the service required is being offered. A service selection function 536 is provided, to select one of a plurality of offered services on the basis of a plurality of received codes. A service configuration function 538 is provided, to configure the DSP device 510, processor 514 and/or modem 516 in accordance with the service selected.

Figure 12:
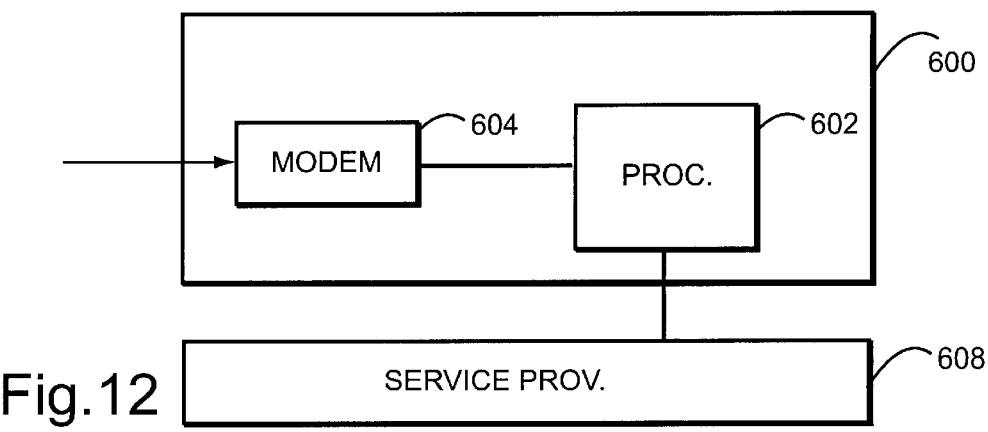
FIG. 12 is a block diagram showing the structure of service provider apparatus in the fourth embodiment of the invention.

Referring to FIG. 12, service provider equipment 600 in this embodiment comprises a processor 602 connected to the telecommunications channel 501 via a signalling circuit (e.g. modem) 604, and having a control output line or bus 606 for selectively controlling the operation of one or more service provision devices 608. Typically, the processor 602 and modem 604 form part of the control equipment at an exchange 5 or 6, and the service provision equipment 608 forms part of the infrastructure of a telecommunications network 2, 3 or 7, either in the exchange or elsewhere.

Referring to FIG. 13, the functions performed by the processor 602 in this embodiment are indicated as separate blocks (which as above in relation to FIG. 11 may be performed by separate programmes or by separate hardware). These functions comprise a code construction function 630 (functionally the same as the code construction function 530); a code analysis function 632 (functionally the same as the code analysis function 532 described above); a service creation function 634; and a service set up function 636.

Referring to FIG. 14, an exemplary code structure is indicated. The code comprises a sequence of digital bits, transmitted in serial form via the communications channel 501. The signal comprises an origin portion 650 indicating the service provider supplying the service; a price portion 660 indicating the cost of the service; a service specification portion 670 comprising technical and/or functional data specifying the type and/or performance or the service; and a compatibility portion 680 indicating the identity of other services with which it either will or will not operate.

In this embodiment, the data contained in these portions 650–680 is arranged hierarchically; that is to say, at several successive levels of detail.

Referring to FIG. 15a, the origin portion 650 for example comprises a country code 651, followed by a service provider code 652 within the country identified in the country code; followed by, optionally, a range identifier code 653 indicating a service range (e.g. of compatible services offered by the same service provider identified in the service provider code 652); and a service name code 654 uniquely identifying a name of service the subject of the code 640. As indicated in FIG. 15b, the technical and functional portion 670 comprises a signal type code 671 (e.g. identifying the service as relating to one of voice, video, image or data); followed by one or more hierarchically arranged service descriptor codes 572, 573 successively specifying greater levels of detail concerning the service (e.g. that it is a video conference service, and that it uses a particular algorithm such as the MPEG data compression algorithm) and one or more codes indicating functional, performance or quality criteria (e.g. a data rate code 674 and a delay code 675).

Figure 16:
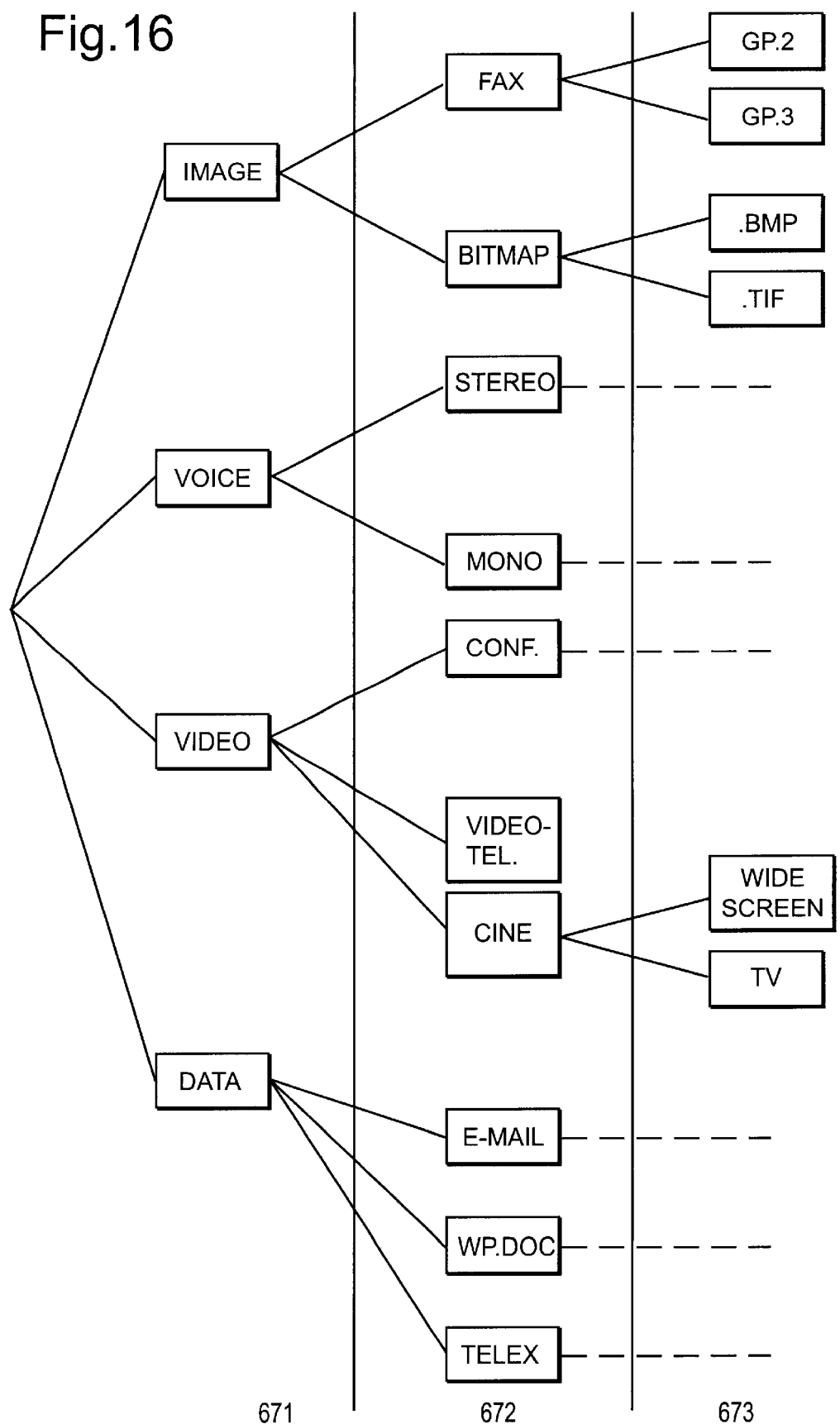
FIG. 16 is a diagram illustrating the linkage between records stored in the memory of the apparatus of FIG. 10 corresponding to the signals of FIGS. 14 and 15.

FIG. 16 illustrates the hierarchial arrangement of the type code 671 and the service descriptor codes 672, 673; for example, if the type code is "image", the code 674 identifies the image type with greater particularity as being a facsimile image or a bit map image; and the code 675 specifies, for the service type concerned, the type of compression or coding employed for the image for example, for a facsimile image, group 2, group 3 or group 4 code; for a bit map image code in field 674 a .BMP or .TIF format or any other suitable format). The functional performance codes 674, 675, 676 may likewise be arranged in a hierarchial manner; that is to say, a given service type code such as facsimile may have associated predetermined data rates associated, for example, with the different transmission protocols, so that the significance of a functional or quality code 674 or 673 depends upon the identity of the service type codes 671, 674, 675, 676 which precede it.

Stored in the random memory 520 of the customer terminal 500, and within the service provider apparatus 600, is data equivalent to the structure shown in FIG. 16, for the performance of the code analysis functions 532, 632. When a code 640 is received by either the customer terminal 500 or the service provider equipment 600, this data is accessed; it may for example be stored in the form of an encoding look up table, so that when a code portion (650–680) is supplied to the address inputs of the lock up table, code definition data is read from the corresponding data output lines of the lock up table.

Thus, referring to the service data shown in FIG. 15b, on receipt first of the signal type code 671, the processor 614 supplies the code 671 to the address lines of the random access memory 530, and reads from the data lines thereof a corresponding signal type (image, voice, video, data), together with a pointer to the area of the random access memory 520 in which the service definition codes 672 relating to that signal type are to be found. This pointer is then added to the receive code value 672 by the processor 514 and the result is used to access the random access memory 520 to read the corresponding service type (e.g. fax or bit map) from the data lines of the memory 520, together with, if available, a pointer to a further service type or functional definition code 673–676.

Also stored within the random access memory 520 and within the service provider apparatus 600 is a decoding lock up table storing the reverse of this (i.e. code values for the code fields 650–680, addressed by data representing the desired service type, originator and so on), with the aid of which the processor 514 forms the code construction function 530.

The operation of this embodiment will now be explained with reference to FIGS. 10–18.

Figure 17:
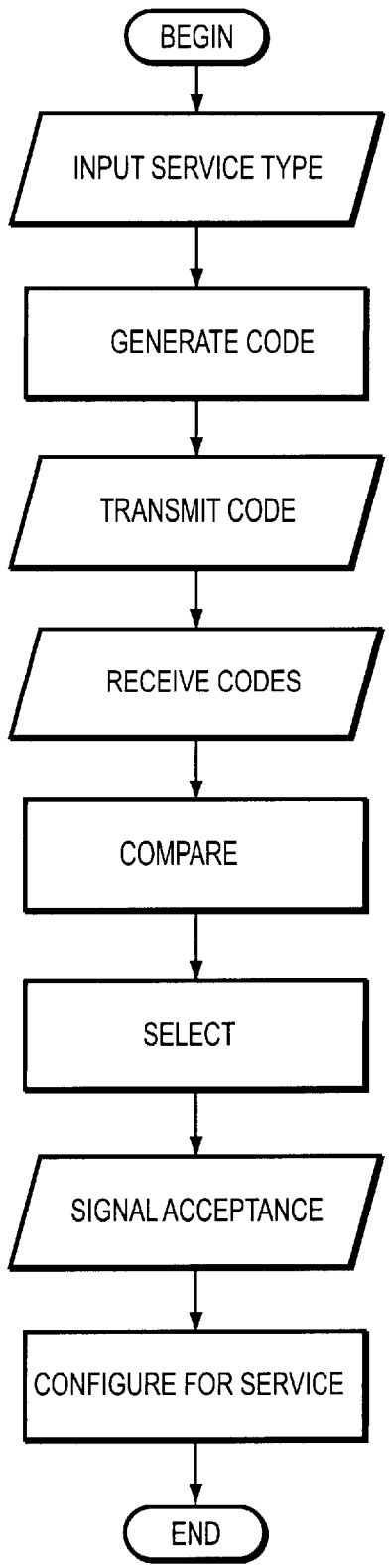
FIG. 17 is a flow diagram showing the operation of the apparatus of FIG. 10.

Referring to FIG. 17, when a user wishes to utilise a telecommunications service (for example set up a video conference, or a video on demand session) he inputs the desired service (e.g. selecting from a menu, or as described in greater detail below, from a graphic interface) using the keyboard 522 or cursor control device 524.

The processor 514 performs the code construction function 530 by accessing the encoding lock up table to generate a service provision polling signal 640. The origin portion 650 is set to a generic value (for example by entering a universally recognised code, such as a zero, in the country code field 651). A generic value (for example zero) is likewise inserted into the price field 660. A code representing the signal type (image, voice, video, data; for example video) is written into the field 671 and a service type code 672 (indicating, for example, video on demand) is written into the code field 672. Further fields 673–676 may include codes, or may be skipped (for example, by inserting a "skip" code indicating that the definition is complete). If any other services or systems are operating on the customer terminal 500, a code indicating for example) the operating system type may be written in to the compatibility portion 680. A polling flag 690 is set to a value indicating that the signal 640 is a polling signal.

The customer terminal 500 then transmits the generated signal via the modem 516 through the telecommunications channel 501, to the local exchange or switching centre, where the signal is passed to the service provider apparatus 600 of each service provider connected to the network, in broadcast fashion.

Figure 18:
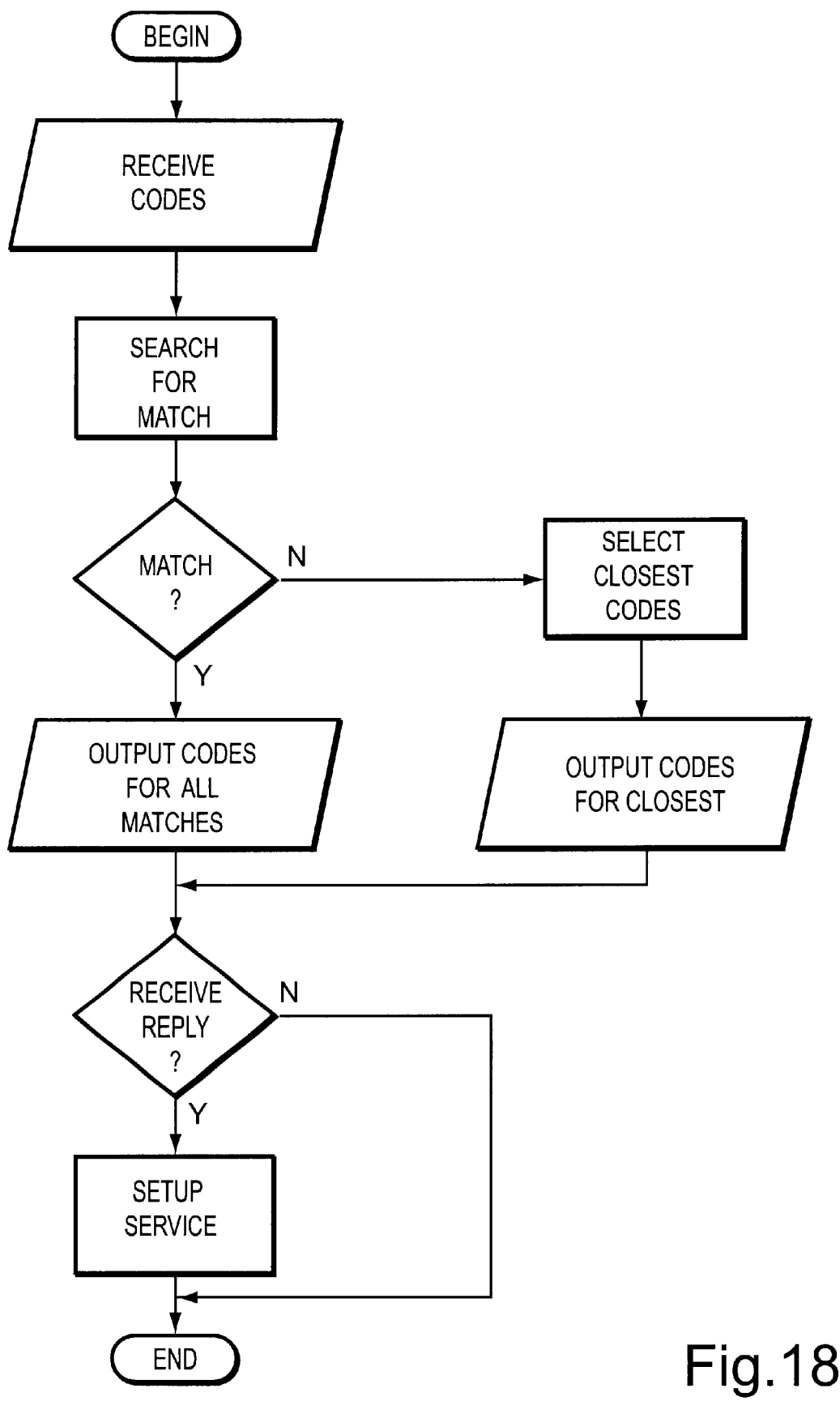
FIG. 18 is a flow diagram showing the operation of the apparatus of FIG. 12.

Referring now to FIG. 18, the code is received by each service provider apparatus 600 and compared with the stored codes corresponding to the services offered by the service provision apparatus 600. The portions of the received code which are blank or not present are ignored in the comparison. If the service provider apparatus 600 finds one or more matching codes, in its store, it outputs each matching code, prefixed by the address or routing data indicating the terminal equipment 500. In this case, each code supplied by the service provision apparatus 600 corresponds to that received from the customer equipment 500, but includes origin data 640, and a price code 660 indicating the price (per second, per byte, per frame or per packet), and it may include additional specification nodes indicating either performance data of the service offered (e.g. delay, average byte area rate and so on) or specification of the manner in which the service is performed (e.g. definition of the data compression or encryption algorithm used).

On the other hand, if the service provider apparatus 600 does not find a match for the received code (in other words, it does not offer a service matching precisely the received specification), then the service provider apparatus 600 locates the most similar stored codes and outputs these instead. The similarity is judged by omitted the hierarchically lowest code portions of the received codes, and repeating the comparison. Thus, for example, if a received code includes a portion 671 indicating video; a portion 672 indicating videoconference; and a portion 673 indicating a 384 kilobit/second bit rate, and the service provider apparatus 600 does not have a matching code stored, the code portion 673 is omitted and the exercise is repeated. If the service provider apparatus 600 has a stored code corresponding to a 64 kilobit per second videoconference service, there will now be a match for the code portions 671 and 672, and the code for the 64 kilobit/second video conference service will be selected and transmitted back to the customer terminal apparatus 500.

Returning to FIG. 17, the customer terminal apparatus 500 receives, via the modem 516, codes from one or more service provider apparatus 600, generated in the way described above. The received codes are temporarily stored, and each is compared with the transmitted code. If there is only a single match, in other words if only one service provider is offering the service required, then that code is selected and an acceptance signal is transmitted by the processor 516 back to the service provider apparatus which sent the matching code.

Returning to FIG. 18, that service provider 600 receives the acceptance signal, and establishes the service required by the customer apparatus via the control bus 606 issuing an instruction to the service provision unit 608. The customer terminal apparatus processor 514 then controls the modem 516 and DSP device 510 to configure them for receipt of the service.

If, instead of receiving only a single matching signal, the customer terminal apparatus 500 receives several signals which match the signal transmitted, it selects one of the offered services. In this embodiment, the selection is performed simply by comparing the prices indicated in the price portions 660, and selecting the lower price. After selection of the code with the lowest price, and the process proceeds as described above.

In other embodiments, selection may take account also of any additional technical or functional criteria indicated by portions of the received code additional to those portions which match the transmitted code (in other words, any "extras" offered by the service provider apparatus 600). Further, the choice may depend upon stored records of previous services acquired from the service provider apparatus 600, in any of the ways described in our above referenced international application.

In the event that none of the received codes precisely match the transmitted code, the customer terminal equipment 500 selects one of the codes on the basis of its similarlity to the transmitted code. The processor 514 in this embodiment stores predetermined weighting constants for each point of difference, for each type of service, so that for example a failure to match a specified maximum delay code may be allocated a weight of 0.5, and a failure to match a specified bit rate may be allocated a weight of 0.8. For each difference between the transmitted code and each received code, the weight is added to an accumulated total. The received code with the lowest accumulated total (i.e. that which is closest, taking account of the weighting values, to the transmitted code) is selected, and the process proceeds as before.

In this embodiment, the prices of the different services corresponding to the different received codes are also taken into account, by multiplying the price indicated by the price code portion 660 by a (relatively small) weight. Thus, a very large price difference between services offered may cause the selection of a lower priced, more technically different service.

After selecting one code on this basis, the process proceeds as described above to set up the service required.

In the event that the compatibility portion 680 indicates that any received code is incompatible with any service or equipment operating at the customer terminal 500, that code is rejected from the comparison.

In the event that a received code does not correspond to any code stored at the customer terminal equipment 500, and thus represents a service for which the processor 514 lacks configuration data, the processor 514 may signal a request for configuration data to the service provider equipment 600, which is arranged correspondingly to download set up data (for example an encryption algorithm or a data compression algorithm) to the customer terminal apparatus 500. The processor 514 in this case loads the algorithm into RAM 520 accessible by the DSP 510 as program memory.

When, as described above, the service origin code field is set by the customer terminal to a generic value, any service provider equipment 600 connected to the communications channel 501 via a telecommunications network can respond. However, equally the customer terminal 500 may issue a more restricted polling signal by specifying the service providers in some level of detail, for example, service providers within the same country may be specified by setting a country value in the country code portion 651, or a given service provider may be specified by setting the country code and service provider code 651, 652.

In this embodiment, the service create function 634 within the service providers equipment 600 is arranged, on receipt of a polling code signal from customer apparatus 500, to create a service to match the required service, as an alternative to locating a similar service. The code analysis function 632 analyses the received code, and determines the generic type of service from the fields 671–673, and the required performance criteria from the fields 674, 675, 676. The processor 600 then interrogates the service provider units 608 to determine whether existing services are provided which can be combined to match the required service (for example, whether there are sufficient 64 kilobit lines to be combined to support a 384 kilobit video conference session, or whether a mono video telephone circuit can be provided together with a stereo audio line). In the event that service provider units 606 exist which provide services which can thus be combined to generate the required service, the processor 600 stores the new code for the new service and outputs the code to be customer terminal equipment 500. The contents of the price field for the new service may be obtained by adding the prices of the component services.

The service provider equipment 600 may, rather than interrogating associated service provider equipment 608, seek to obtain the desired services or a component thereof from further service provider equipment 600, by generating its own polling signal. Thus, a given service provider equipment 600 may obtain services from a competing service provider, to be combined for the customer equipment 500. For example, the customer equipment 500 may only be authorised to contract with a limited number of service providers (for example, those within the same country), for credit reasons, whereas the service provider equipment 600 may have (or be able to enter into), contractual relations with other service providers located abroad. In this embodiment, therefore, the service provider equipment 600 includes components of, and likewise functions in the same manner as, the customer terminal 500 in both supplying and obtaining services.

When this embodiment is combined with the foregoing embodiments, the code received by the customer terminal equipment 500 is stored for subsequent accounting purposes as described above.

Payment may be effected in this embodiment according to the methods described above or in our above referenced international application.

Further according to this embodiment, the service provider equipment 600 is preferably arranged to monitor the polling signals requesting services which it receives, and periodically to perform the service creation function 634 to create new services in response to the perceived requirements of users or provision by competing service providers.

For example, by monitoring the compatibility codes 680, the popularity of hardware or software used by customer terminals 600 can be monitored, and a service provider can modify its services to ensure that they are compatible with popular customer equipment, or to exclude compatibility with competing services offered by rival service producers.

Thus, in this manner, de facto standards for service provision can be set by the service provider equipment 600 of competing service providers, responding directly to the need for compatible products, and driving incompatible products from the market.

Preferably, to facilitates the development of new services, the codes 640 are arranged such that different technical and functional aspects of each code are arranged hierarchically, so that services provision apparatus 600 or customer terminal apparatus 500 is able, on receipt of an unknown code, to determine the generic class of services to which it belongs, its performance, and some detail of the manner in which the performance is achieved; thus, fields may be provided specifying the data encoding employed, the compression applied, and so on.

In this way, service provider equipment 600 may generate entirely new services by taking parts of the codes of the successful services and combining them, in a genetic fashion, or by extracting the common parts of codes corresponding to widely used services.

Thus, to sum up, in this embodiment, telecommunication services or services available through a communications network are ordered, from a range of different services, by the transmission of a code specifying the service required between customer equipment and service provider equipment. The code, the customer equipment and the service provider equipment are so arranged that, in the case of non availability of the required service, a similar service can be provided or the required service can be created.

This is achieved in this embodiment by structuring the service descriptor codes such that they describe the service not only specifically, but also generically (in other words, they describe the required service at more than one level of specificity).

This is also or alternatively achieved by providing that the codes contain separate information on different attributes of the service; for example, the bit rate, the maximum delay, the level of compression and so on. By the use of one or both of these techniques, it is possible to select or create a similar service without requiring precise recognition of the received service code, thus opening the possibilities of competition between similar but non-identical services, and leaving the possibility of adding new services in such a way that the corresponding codes can be interpreted without needing explicitly to be broadcast throughout every service provision and customer terminal apparatus in a network.

For example, one code field may specify the aspect ratio for a picture (e.g. as either the normal television aspect ratio or a wide screen aspect ratio corresponding to cinematic or HDTV formats). The service provision apparatus 600 may observe that, for video on demand and video telephony services, services with a wide screen aspect ratio are becoming more popular, and may accordingly create other video services such as video conferencing with a wide screen format in place of a previously used format.

On creation of a new service in this manner, the service provider apparatus 600 may be arranged to broadcast to all customer terminal equipment 500 connected to the network to announce the service, and customer terminal equipment 500 may correspondingly be arranged to store the new code in the memory 520 for subsequent access. In this embodiment, rather than the price portion 660 being fixed, subsequent price negotiation may be carried out between the customer terminal equipment and the service provider equipment, as described in out above referenced international application.

Fifth Embodiment

This embodiment is an extension of the immediately preceding embodiment (but may be used separately thereof), and the description of the preceding embodiment is incorporated herein and applies in its entirety hereto. This embodiment is concerned with the user interface presented at the customer terminal equipment 500 to facilitate selection of services.

In this embodiment the processor 514 is arranged to operate a graphical user interface (GUI) such as the Windows (TM) environment (available from Microsoft Corporation), or the X-Windows environment. Each service available is represented by an icon image displayed on the VDU 502. Selecting an icon with the mouse or other cursor control device 524 (in the manner conventionally provided by graphically user interfaces and hence requiring no description herein) causes the execution of the process of FIG. 17 for the code corresponding to the icon representing the desired service of the VDU 502.

It is envisaged that a large number of services will be offered via networks such as the Internet, and if the icons are merely allocated to services on an ad hoc basis, the resulting number could well be much too large for simultaneous display, or sensible selection, by a user.

The present invention therefore provides that icons for similar services are similar in appearance, and more particularly that attributes of services are represented consistently, so that all icons representing a particular service type (for example video telephony) all have an identical common portion visually representing that service. Likewise, icons corresponding to the services of one service provider may carry a name or logo identifying the service provider origin, and icons sharing a functional attribute such as a common bit rate may have a visually identical portion of the icon in common.

Figure 19:
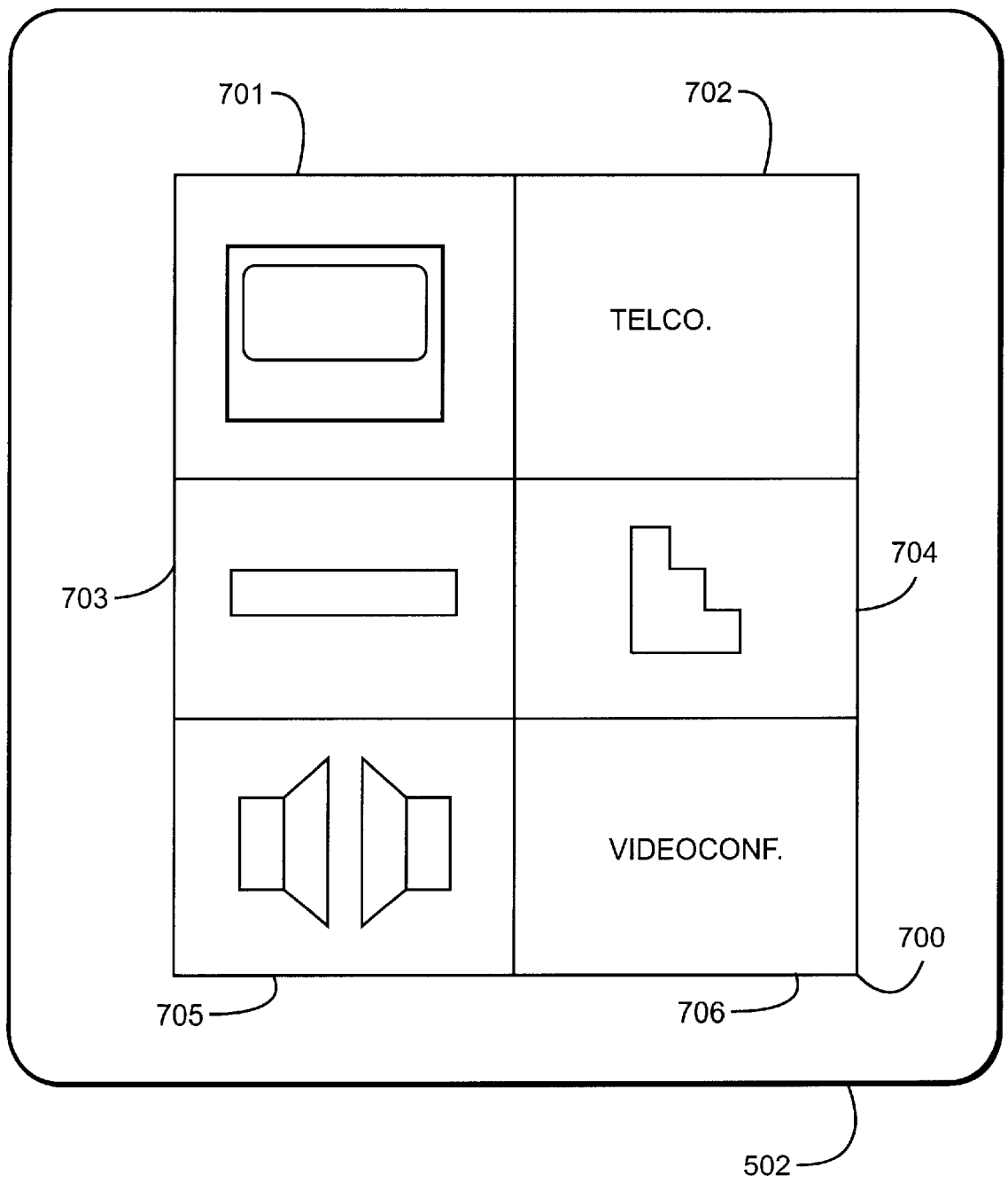
FIG. 19 is a diagram illustrating the display on a screen forming part of the apparatus of FIG. 10 in a fifth embodiment of the invention.

Referring to FIG. 19, example icon 700 is shown displayed (not to scale) on the VCU 502. The icon consists of a number of regions 701–706. Region 701 corresponds to field 671, and shows a VDU, indicating that the service is a video service. Region 706 corresponds to field 672, and indicates that the service is a videoconferencing service. Region 702 corresponds to fields 651 and 652, and indicates the identity of the service provider (for example, by way of a logo or the name of the service provider). Field 703 corresponds to an attribute field such as 674 or 675, and indicates graphically the aspect ratio. Field 704 corresponds to another attribute field 674–675, and indicates the image quality or granularity. Field 705 corresponds to a yet further attribute field, and indicates the sound quality (in this case, stereo).

Thus, according to this embodiment, for each code 640 corresponding to a given service, common code portions are represented for all services by similar or identical icon portions.

Figure 20:
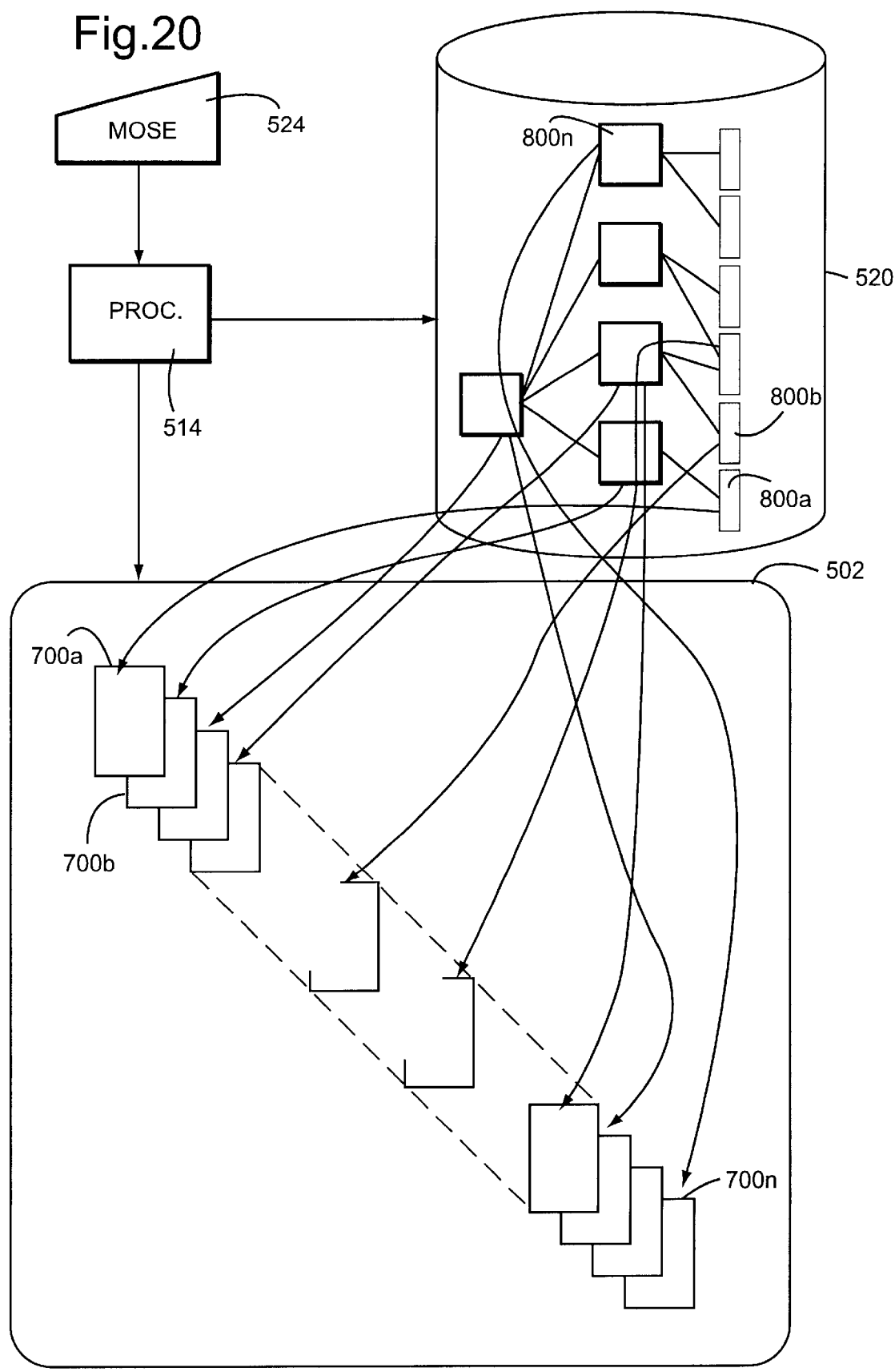
FIG. 20 is an explanatory diagram illustrating the relationship between data stored in the memory of that device and data displayed on the screen of that device.

Referring to FIG. 20, the store 520 within the user terminal stores a plurality of service code icons 700*a*, 700*b* . . . . 700*n* as corresponding icon records 800*a*, 800*b* . . . . 800*n*. Each record 800 comprises the display data defining the manner in which the icon will be represented, together with a pointer to a predecessor icon record, and, in some cases, one or more successor icon records. The pointers are arranged such that the icon records define a tree structure. Each icon record also includes a pointer to a corresponding service code 640 stored in the store 520. There is a one to one correspondence between icon records and service codes. The pointers of the icon records 800 are hierarchically arranged in accordance with the contents of the codes 640, such that icons which correspond to codes having common portions point to icon records corresponding to codes comprising only those common portions (and thus generically describing multiple services). Thus, for example, the icon 700 illustrated in FIG. 19 and another icon relating to a similar service but offering mono sound would both point to a predecessor icon record 800 which generically describes video conferencing services.

The display data may comprise a file of binary image data defining a black and white bitmap, such as (for a Unix embodiment) that described in the generic Unix file /. . fileaddress. . /bitmap, or a colour bitmap.

Displaying and Selecting From a Plurality of Icons

Rather than displaying all icons together at the same time, the processor 514 of the present embodiment is arranged to display icons sequentially in a series. The series is defined by the pointers linking the icon records 800 in the store 520. Thus, in one example of the present embodiment, when a user holds down the mouse 524 button continuously, the processor 514 is arranged to sequentially access the icon records 800 in the store 520 and display corresponding icons 700 in sequence; typically starting with a first icon record corresponding to the most generic service code (the root node of the hierarchical tree structure of icon records; and selecting, as the next icon record, one of the successor icon records pointed to thereby, and thereafter proceeding down a branch of the tree, so as to generate a sequence of more specific, less generic, icons, until an icon record 800 is reached which corresponds to a code 640 which is not generic to any other service (i.e., represents a unique service).

The processor 514 thereafter re-accesses the predecessor icon record 800 (i.e. the closest level of generality to the just reached specific service icon) and then selects a different succesor icon record, so as to proceed down a different branch of the structure. In this manner, a sequence of icons 700 are displayed which are visually similar, each differing from its predecessor by one or more changes, and corresponds to technically similar services. The user can thus "brose" through all the services available.

On reaching a desired service, the user ceases to depress the mouse 524 button, and may select the required service (e.g., by "double clicking" the mouse button in known fashion). On doing so, the processor 514 accesses the icon record 800 associated with the displayed icon 700; locates the code pointed to by the code pointer in the icon record 800; and follows the process of FIG. 17 to acquire the corresponding service.

To avoid traversing the entire list of stored icon records 800, the user may input (via the keyboard 522 or mouse 524) a generic specification of services required (e.g. video conferencing; and the processor 514 may select a generic icon record 800 corresponding to the desired service, and commence the sequential display from this icon record rather than from the most generic icon record (root node of the tree).

From a displayed icon 700, as indicated for example in FIG. 19, the user may, utilising the cursor control device

524, select a particular icon field and alter the contents of that field in particular. For example, by selecting (e.g. positioning the cursor over) the service provider field 702 a different service provider may be selected by clicking the mouse button; on detection of such user action, the processor 514 reads the corresponding fields 651,652 of the code 640 pointed to by the icon record 800 of the displayed icon 700; finding the code which has the next value (e.g. by incrementing the value, the service provider field 652; and displaying the icon 700 corresponding to the icon record 800 pointing to that code. Thus, the user can scroll through services of the same description offered by different providers. Likewise, by selecting a different one of the icon regions 701–706, one parameter of the service at a time can be modified.

To maintain visual continuity in the sequential display, the processor may generate and store "dummy" icons interpolated between successive icons displayed, and not corresponding to service codes. During display of a sequence, the dummy icons are displayed, but cannot be selected.

Creating a New Service Code

In this embodiment, the user is able to modify the icon 700 which is displayed in a way which does not correspond to any currently stored code, to create a new service specification. For example, in the above example, if the user wishes to obtain the video conference service displayed in FIG. 19 from a different service provider, for whom no such service code is stored in the store 520, the processor 514 alters the displayed icon 700 to display the desired service provider; fails to locate a stored code corresponding thereto in the store 520; and accordingly creates a new icon record 800 corresponding to the modified icon 700; and a new code 640 corresponding to the code pointed to by the unmodified icon, but with a modified service provider code 651.

Next, the processor 514 transmits the code, via the communications channel 501, to the service provider thus selected, and the service provider is able, as in the preceding embodiment, either to create the required service and signal back price to the processor 514, or to indicate that the desired service is unavailable. In the later case, the processor 514 deletes the new created icon, icon record 800 and code 640 and indicates to the user that the attempt has been unsuccessful.

In exactly the same way, any functional or technical aspect of a displayed icon 700 may be altered by the processor 514 on the instruction of the user, and a corresponding new code 640 may be created and transmitted to one, several or all service providers in an attempt to obtain the new required service.

Receiving New Icons

When a service provider creates a new service, it may broadcast the code corresponding thereto to one or more customer terminals via the communications channel 501. On receipt of a new code, the processor 514 stores the new code, in the store 520; compares the code with the already stored codes; and creates a new icon record 800 in the store 520. The new icon record 800 is positioned in the tree structure by setting its pointers to point, as predecessor icon record, to the icon record corresponding to the code with which it has most code portions in common (i.e. which is the closest code which is generic to it). An icon image is created, based on the icon image of this predecessor icon record, but differing in one or more icon regions. The different icon image regions may either be defined from pre-existing data (such as an existing service provider logo, where the service differs only in service provider, or may be blank or arbitrarily filled, or the signal received from the service provider may itself include image data for defining the icon 700.

Service providers, or other parties, may be arranged to transmit complete icon records and icon display data, together with associated selection codes, making up a series or a sequence of icons to one or more customer terminals, for subsequent use. The supply of such icon records may itself be a service which is selectable via an icon image 700.

The sequence of icons may be run on a hypertext programme, such as Mosaic (a programme available from the University of Illinois, USA).

In one arrangement according to this embodiment, the icon sequences and corresponding records may be stored at a remote station (e.g. a server computer) accessed by one or more customer terminals, the server computer being arranged to access one or more service providers on behalf of the customer terminals. The present invention in all aspects extends generally to such systems where the user terminal accesses remote servers executing all or part of the functionality of the invention.

Rather than using a mouse as the cursor control device 524, naturally, a track ball or joystick or other cursor control device may be used, or speech recognition or some other type of input may equally be employed.

Further data relating to the service concerned may be stored within the store 520, and may be accessed by a user from the icon 700; for example, text describing each field of the codes 640 pointed to from the icon record 800 from the icon 700 may be stored in the store 520, and accessed (for example in hyper-text fashion) on selecting the icon. Equally, a sample of the service concerned may be stored (e.g. as compressed video and sound sequence) and replayed, to illustrate the service.

It will be apparent that, although this embodiment is particularly useful with the above described embodiments and with out above referenced international application, it may also be utilised independently of these embodiments, for example for the obtaining of goods or services via the telecommunications channel such as video on demand services. In this case, each icon may be a snapshot or advert of a film, icon records being hierarchically linked according to a classification of the film as, for example, action/romance/comedy/historical, and fields being provided for (for example) indicating the presence of given actors, level of violence and so on. The above described features of this embodiment may be used to request supply of a video from one or more service providers, either from a known, stored, sequence of videos, or by creating a request for, for example, a generic western video, or a video starring a certain actor.

SUMMARY

It will be clear from the foregoing that the preceding embodiments are useful, either individually, or in combination. Protection is according sought for any and all novel subject matter contained herein, whether or not it lies within the scope of the accompanying claims, together with any and all variations, modifications or substitutions thereto which will be apparent to the skilled reader.

What is claimed is:

1. A communication system comprising:
    a communication utilizing apparatus connectable to a communications network,
    service provision apparatus for making services available to the communications utilizing apparatus, and an accounting device associated with the communications utilizing apparatus, said accounting device comprising:

a digital data storage device arranged to store details of the receipt of services by the communications utilizing apparatus;

a signalling circuit arranged to receive, via the communications network, signals indicating a payment already due in respect of services previously provided by the service provision apparatus; and a comparison device arranged to compare the received indications with data derived from the stored details.

2. A system as in claim 1, in which the communications utilizing device is arranged to utilize, and the service provision apparatus to provide, telecommunication services.

3. A system as in claim 1 in which the accounting device comprises part of the communications utilizing apparatus.

4. A system as in claim 1 in which the accounting device is arranged to automatically initiate cashless payment in dependence upon the comparison performed by the comparison device.

5. A system as in claim 4, in which the accounting device comprises a reader for accepting an insertable payment token.

6. A system as in claim 5, in which the payment token is a card.

7. A system as in claim 6, in which the card comprises a programmable memory device.

8. A system as in claim 1 in which:

the signalling device is arranged to receive a signal indicating a total payment already due in respect of a plurality of services previously supplied, and the comparison device is arranged to compare the total with a total corresponding to data stored in the storage device in respect of receipt of the same services.

9. A system as in claim 1 in which:

the signalling device is arranged to receive a record signal comprising data detailing a plurality of records of services supplied, and the comparison device is arranged to compare the data with corresponding records stored in the storage device in respect of receipt of the same services.

10. A system as in claim 9, in which:

the comparison device is arranged to compare received data with a selected subset of the records stored in the storage device.

11. A system as in claim 1 in which, in the event of detection of mismatch, the accounting device is arranged to supply a mismatch signal via the signalling circuit to the communications network, said accounting device detecting a mismatch by detecting discrepancy between details of services received as stored locally and the signal received via the communications network indicating a payment already due.

12. A system as in claim 11, in which the service provision apparatus is arranged, in response to one or more said mismatch signals, to initiate an equipment check process.

13. A system as in claim 11 in which the service provision apparatus is arranged to store data indicative of said mismatch.

14. A system as in claim 13, in which the service provision apparatus is arranged to utilise said stored mismatch data in subsequent service provision to the utilizing apparatus.

15. A communication system comprising:

a communication utilizing apparatus connectable to a communications network, service provision apparatus for making services available to the communications utilizing apparatus, and an accounting device associated with the communications utilizing apparatus, said accounting device comprising:

a digital data storage device arranged to store details of the receipt of services by the communications utilizing apparatus;

a signalling circuit arranged to receive, via the communications network, signals indicating a payment due in respect of services provided by the service provision apparatus; and a comparison device arranged to compare the received indications with data derived from the store details;

in which, in the event of detection of mismatch, the accounting device is arranged to supply a mismatch signal via the signalling circuit to the communications network; and the service provision apparatus is arranged, following receipt of a said mismatch signal, to generate an adjusted total payment due and to transmit a further total signal to the utilizing apparatus.

16. An accounting device in local association with a communication utilizing device in a communication network, said accounting device, comprising:

a digital data storage device arranged to store details of the receipt of services by a locally associated communications utilizing device;

a signalling circuit arranged to receive, via the communications network, signals indicating a payment already due in respect of services previously provided by service provision apparatus of the network; and a comparison device arranged to compare the received indications with data derived from the stored details.

17. A telecommunications utilizing apparatus, the apparatus incorporating an accounting device as in claim 16.

18. Service provision apparatus for use in a system as in claim 1, the apparatus comprising:

a service provision device to provide telecommunications services;

a signalling circuit for connection to a communications channel of the system; and a processor connected to the signalling circuit and having a control output line for selectively controlling the operation of the service provision device.

19. A communications network hierarchy comprising:

a plurality of component network, a first such component communications network being accessed by a user terminal via at least one second component communications network, said second component communication network including an accounting unit arranged to store records of the usage of said first component communication network by said second component communications network, and to control payment to said first component communications network in respect of said usage.

20. A network accounting station for use in a communications network as in claim 19, said network accounting station comprising:

a supplier interface circuit including a store storing data relating to services obtained from one or more communications service suppliers; and a customer interface circuit for transmitting signals indicating a payment due in respect of said services, via said communications network to one or more service utilizing terminal stations.

21. An account processing system comprising:

a store storing details of use of telecommunications services previously provided by one or more customer via a communications network, and a signalling circuit connected to said store and said network and arranged to transmit a signal, via said network, to one or more terminal stations associated respectively with said one or more customers, indicating a payment already due in respect of said services at a predetermined time of low usage of said network.

22. A method of maintaining and checking distributed billing records for consumed communications services, said method comprising:

accumulating machine-stored billing information, for plural instances of communications services, previously consumed over time but not yet paid for, at both customer premises equipment and communication service provision equipment within a communications network;

periodically machine-communicating at least some of the accumulated billing information from said service provision equipment to said customer premises equipment using said communication network; and at the customer premises equipment, machine-comparing received accumulated billing information from the service provision equipment with locally accumulated and stored billing information for previously consumed unpaid communications services.

23. A method as in claim 22 further comprising:

automatically effecting machine-payment for unpaid consumed communication services corresponding to compared billing information that substantially matches during said comparing process.

24. A method as in claim 23 wherein said payment is effected via an electronic payment taken inserted into the customer premises equipment.

25. A method as in claim 22 wherein said received and compared accumulated billing information includes a total payment due for said plural instances of consumed but unpaid for communications services.

26. A method as in claim 22 wherein said received and compared billing information corresponds to only a subset of the accumulated plural instances of consumed but unpaid for communications services.

27. A method as in claim 22 wherein, in the event of a substantial mis-match between compared information, the customer premises equipment signals back to the service provision equipment identifying mis-matched information records.

28. A method of maintaining and checking distributed billing records for consumed communications services, said method comprising:

accumulating machine-stored billing information, for plural instances of communications services, consumed over time but not yet paid for, at both customer premises equipment and communication service provision equipment within a communications network;

periodically machine-communicating at least some of the accumulated billing information from said service provision equipment to said customer premises equipment using said communication network;

at the customer premises equipment, machine-comparing received accumulated billing information from the service provision equipment with locally accumulated and stored billing information for previously consumed unpaid communications services;

in the event of a substantial mis-match between compared information, the customer premises equipment signals back to the service provision equipment identifying mis-matched information records; and automatically initiating a check of the customer premises equipment in the event of a history substantial mis-match signals.

29. A method of maintaining and checking distributed billing records for consumed communications services, said method comprising:

accumulating machine-stored billing information, for plural instances of communications services, consumed over time but not yet paid for, at both customer premises equipment and communication service provision equipment within a communications network;

periodically machine-communicating at least some of the accumulated billing information from said service provision equipment to said customer premises equipment using said communication network;

at the customer premises equipment, machine-comparing received accumulated billing information from the service provision equipment with locally accumulated and stored billing information for previously consumed unpaid communications services;

automatically effecting machine-payment for unpaid consumed communication services corresponding to compared billing information that substantially matches during said comparing process; and in the event of detecting some mis-matched information during said comparing, effecting an adjusted reduced total payment if the degree of mis-match is within a pre-determined variance.

* * * * *

UNITED STATES PATENT AND TRADEMARK OFFICE
CERTIFICATE OF CORRECTION

PATENT NO.      : 6,577,858 B1
DATED           : June 10, 2003
INVENTOR(S)     : Michael A. Gell It is certified that error appears in the above-identified patent and that said Letters Patent is hereby corrected as shown below:

<u>Title page,</u>
Item [56], References Cited, should read as follows:
-- [56]     References Cited
     U.S. PATENT DOCUMENTS

| | | | | |
|---|---|---|---|---|
| 4,359,631 | A | 11/1982 | Lockwood et al. | |
| 4,640,986 | A | 2/1987  | Yotsutani et al. | |
| 4,776,000 | A | 10/1988 | Parienti | |
| 4,776,003 | A | 10/1988 | Harris | 455/407 |
| 4,777,646 | A | 10/1988 | Harris | 455/407 |
| 4,933,966 | A | 6/1990  | Hird et al. | |
| 4,965,821 | A | 10/1990 | Bishop et al. | |
| 4,979,207 | A | 12/1990 | Baum et al. | |
| 5,036,314 | A | 7/1991  | Barillari et al. | |
| 5,046,085 | A | 9/1991  | Godsey et al. | 379/112 |
| 5,109,401 | A | 4/1992  | Hattori et al. | |
| 5,134,651 | A | 7/1992  | Ortiz et al. | |
| 5,142,566 | A | 8/1992  | Meschi | 379/98 |
| 5,206,488 | A | 4/1993  | Teicher | |
| 5,220,593 | A | 6/1993  | Zicker et al. | 379/144 |
| 5,272,747 | A | 12/1993 | Meads | 379/144 |
| 5,276,679 | A | 1/1994  | McKay et al. | |
| 5,359,182 | A | 10/1994 | Schilling | 379/357 |
| 5,361,297 | A | 11/1994 | Ortiz et al. | |
| 5,577,101 | A | 11/1996 | Bohm | 379/119 |
| 5,631,947 | A | 5/1997  | Wittstein et al. | |
| 5,751,798 | A | 5/1998  | Mumick et al. | 379/112 |
| 5,774,533 | A | 6/1998  | Patel | 379/127 |
| 6,098,878 | A | 8/2000  | Dent et al. | 235/380 |
| 6,101,379 | A | 8/2000  | Rahman et al. | 455/406 |
| 6,108,531 | A | 8/2000  | Berg et al. | 455/408 |
| 6,115,601 | A | 9/2000  | Ferreira | 455/406 |

UNITED STATES PATENT AND TRADEMARK OFFICE
CERTIFICATE OF CORRECTION

PATENT NO.     : 6,577,858 B1
DATED          : June 10, 2003
INVENTOR(S)    : Michael A. Gell It is certified that error appears in the above-identified patent and that said Letters Patent is hereby corrected as shown below:

<u>Title page (cont'd),</u>
    6,243,574   B1   6/2002    McGreggor et al. ……. 455/418 --

Signed and Sealed this

Tenth Day of February, 2004

JON W. DUDAS
*Acting Director of the United States Patent and Trademark Office*